United States Patent
Dravida et al.

(10) Patent No.: US 8,311,543 B2
(45) Date of Patent: Nov. 13, 2012

(54) METHODS AND DEVICES FOR INTERWORKING OF WIRELESS WIDE AREA NETWORKS AND WIRELESS LOCAL AREA NETWORKS OR WIRELESS PERSONAL AREA NETWORKS

(75) Inventors: Subrahmanyam Dravida, Shrewsbury, MA (US); Jay Rodney Walton, Carlisle, MA (US); Sanjiv Nanda, Ramona, CA (US); Shravan K. Surineni, Marlborough, MA (US)

(73) Assignee: Qualcomm Incorporated, San Diego, CA (US)

( * ) Notice: Subject to any disclaimer, the term of this patent is extended or adjusted under 35 U.S.C. 154(b) by 572 days.

(21) Appl. No.: 11/240,045

(22) Filed: Sep. 30, 2005

(65) Prior Publication Data
US 2007/0008925 A1    Jan. 11, 2007

Related U.S. Application Data

(60) Provisional application No. 60/697,504, filed on Jul. 7, 2005, provisional application No. 60/712,320, filed on Aug. 29, 2005.

(51) Int. Cl.
*H04W 36/00* (2009.01)
*H04W 4/00* (2009.01)

(52) U.S. Cl. ......... 455/437; 455/436; 455/439; 370/338

(58) Field of Classification Search .................. 370/338; 455/436, 437, 439
See application file for complete search history.

(56) References Cited

U.S. PATENT DOCUMENTS

| | | | |
|---|---|---|---|
| 6,088,591 A * | 7/2000 | Trompower et al. | 455/438 |
| 6,473,038 B2 | 10/2002 | Patwari et al. | |
| 6,526,039 B1 * | 2/2003 | Dahlman et al. | 370/350 |
| 6,731,940 B1 | 5/2004 | Nagendran | |
| 6,744,740 B2 | 6/2004 | Chen | |
| 6,801,777 B2 | 10/2004 | Rusch | |
| 6,904,055 B2 | 6/2005 | Pichna et al. | |
| 6,950,655 B2 | 9/2005 | Hunkeler | |
| 6,967,462 B1 | 11/2005 | Landis | |
| 6,983,139 B2 | 1/2006 | Dowling et al. | |
| 7,020,439 B2 | 3/2006 | Sinivaara et al. | |

(Continued)

FOREIGN PATENT DOCUMENTS
CL    27301997    10/1998
(Continued)

OTHER PUBLICATIONS

International Search Report—PCT/US06/026308—International Search Authority, European Patent Office, Mar. 5, 2007.

(Continued)

*Primary Examiner* — Kamran Afshar
*Assistant Examiner* — Omoniyi Obayanju
(74) *Attorney, Agent, or Firm* — Qualcomm Patent Group; Dmitry R. Milikovsky; James H. Yancey, Jr.

(57) ABSTRACT

Embodiments describe utilizing time-based information to improve communication in a wireless network. A method can include receiving beacon information from at least one access point and utilizing time-stamp information associated with the beacon information to determine whether to hand off communication with a second access point. According to other embodiments the method can further include detecting beacon quality is below a threshold level and transmitting a poor beacon quality message. Information relating to a plurality of alternate access points can be received in response to the transmitted poor beacon quality message.

65 Claims, 20 Drawing Sheets

U.S. PATENT DOCUMENTS

| | | | |
|---|---|---|---|
| 7,046,998 B2 | 5/2006 | Verma et al. | |
| 7,058,035 B2 | 6/2006 | English | |
| 7,065,360 B2 | 6/2006 | Yahagi | |
| 7,149,499 B1 | 12/2006 | Oran et al. | |
| 7,167,139 B2 | 1/2007 | Kim et al. | |
| 7,257,105 B2 | 8/2007 | Molteni et al. | |
| 7,260,399 B1* | 8/2007 | Oh et al. | 455/436 |
| 7,359,346 B2* | 4/2008 | Kim | 370/324 |
| 2002/0085516 A1 | 7/2002 | Bridgelall | |
| 2002/0102978 A1* | 8/2002 | Yahagi | 455/437 |
| 2003/0073438 A1 | 4/2003 | Fukushima et al. | |
| 2003/0117966 A1 | 6/2003 | Chen | |
| 2003/0235174 A1 | 12/2003 | Pichna et al. | |
| 2004/0047323 A1 | 3/2004 | Park et al. | |
| 2004/0063426 A1 | 4/2004 | Hunkeler | |
| 2004/0066757 A1 | 4/2004 | Molteni et al. | |
| 2004/1054340 | 6/2004 | Baw | |
| 2004/0137908 A1 | 7/2004 | Sinivaara et al. | |
| 2004/0203851 A1 | 10/2004 | Vetro et al. | |
| 2004/0255037 A1 | 12/2004 | Corvari et al. | |
| 2005/0013264 A1 | 1/2005 | Sundberg | |
| 2005/0039136 A1 | 2/2005 | Othmer | |
| 2005/0058096 A1 | 3/2005 | Cheng | |
| 2005/0058112 A1 | 3/2005 | Lahey et al. | |
| 2005/0068929 A1 | 3/2005 | Chang et al. | |
| 2005/0083846 A1 | 4/2005 | Bahl | |
| 2005/0102424 A1 | 5/2005 | Foll et al. | |
| 2005/0107085 A1 | 5/2005 | Ozluturk | |
| 2005/0128988 A1 | 6/2005 | Simpson et al. | |
| 2005/0147068 A1 | 7/2005 | Rajkotia | |
| 2005/0233749 A1 | 10/2005 | Karaoguz et al. | |
| 2006/0040670 A1 | 2/2006 | Li et al. | |
| 2006/0178147 A1 | 8/2006 | Jagadeesan et al. | |
| 2006/0184795 A1 | 8/2006 | Doradla et al. | |
| 2006/0193295 A1 | 8/2006 | White et al. | |
| 2006/0251077 A1 | 11/2006 | Chou | |
| 2006/0268756 A1* | 11/2006 | Wang et al. | 370/310 |

FOREIGN PATENT DOCUMENTS

| | | |
|---|---|---|
| CL | 13881999 | 11/1999 |
| CL | 34692001 | 11/2001 |
| CL | 2722003 | 11/2003 |
| CL | 18232005 | 5/2005 |
| DE | 10345217 A1 | 5/2005 |
| EP | 1398910 A | 3/2004 |
| GB | 2389005 | 11/2003 |
| GB | 2407230 | 4/2005 |
| JP | 11355831 A | 12/1999 |
| JP | 2000102060 | 4/2000 |
| JP | 2002048567 | 2/2002 |
| JP | 2002112347 A | 4/2002 |
| JP | 2003111123 | 4/2003 |
| JP | 2004500566 | 1/2004 |
| JP | 2004241937 | 8/2004 |
| JP | 2005094776 A | 4/2005 |
| JP | 2005101820 A | 4/2005 |
| JP | 2005528049 A | 9/2005 |
| JP | 2005277815 A | 10/2005 |
| JP | 2005348397 A | 12/2005 |
| JP | 2009500956 A | 1/2009 |
| JP | 2009500957 A | 1/2009 |
| JP | 2009500958 | 1/2009 |
| KR | 20020079726 | 10/2002 |
| KR | 200485719 | 10/2004 |
| KR | 20040093653 | 11/2004 |
| KR | 2010076042 A | 7/2010 |
| RU | 2221335 | 1/2004 |
| TW | 525069 B | 3/2003 |
| TW | 560151 B | 11/2003 |
| WO | WO9718485 A1 | 5/1997 |
| WO | WO9750273 A1 | 12/1997 |
| WO | WO9818277 A2 | 4/1998 |
| WO | WO9828860 A1 | 7/1998 |
| WO | WO9960801 A1 | 11/1999 |
| WO | 0158098 | 8/2001 |
| WO | WO0187279 A2 | 11/2001 |
| WO | 0195592 | 12/2001 |
| WO | WO0195525 A2 | 12/2001 |
| WO | WO03092218 A | 11/2003 |
| WO | 03101139 | 12/2003 |
| WO | WO2004032540 | 4/2004 |
| WO | WO2004063426 A1 | 7/2004 |
| WO | WO2005004354 | 1/2005 |

OTHER PUBLICATIONS

Written Opinion—PCT/US06/026308—International Search Authority, European Patent Office, Mar. 5, 2007.

International Preliminary Report on Patentability—PCT/US2006/026308, International Bureau of WIPO, Jan. 10, 2008.

Taiwanese Search report—095124902—TIPO—May 7, 2009.

European Search Report—EP09177767—Search Authority—Munich—Dec. 21, 2009.

Bhargava B., et al., "Integrating heterogeneous wireless technologies: a cellular aided mobile Ad Hoc network (CAMA)", Mobile Networks and Applications, Kluwer Academic Publishers, Aug. 31, 2004, vol. 9 Issue 4, pp. 1-12.

Li H., et al., "New Approach to Multihop—Cellular Based Multihop Network", Personal, Indoor and Mobile Radio Communications, 2003. PIMRC 2003, 14th IEEE Proceedings on, IEEE, Sep. 10, 2003, vol. 2, pp. 1629-1633.

Nokia Mobile Phones: "User's Guide for Nokia 5110: pp. 1, 2, 5, 6, 23", Nokia Mobile Phones, 2004, XP002688535, Retrieved from the Internet: URL: http://nds2.nokia.com/files/support/apac/phones/guides/Nokia_5110_APAC_UG_EN.pdf [Epo Examiner retrieved on Jul. 19, 2012; see attached EPO Office Action].

Extended European Search Report, dated Aug. 2, 2012, 61 pgs.

* cited by examiner

METHODS AND DEVICES FOR INTERWORKING OF WIRELESS WIDE AREA NETWORKS AND WIRELESS LOCAL AREA NETWORKS OR WIRELESS PERSONAL AREA NETWORKS

CROSS-REFERENCE TO RELATED APPLICATIONS

This application claims benefit under 35 U.S.C. §119(e) from U.S. Provisional Patent application Ser. No. 60/697,504 entitled METHODS AND DEVICES FOR INTERWORKING OF WIRELESS WIDE AREA NETWORKS AND WIRELESS LOCAL AREA NETWORKS OR WIRELESS PERSONAL AREA NETWORKS and filed Jul. 7, 2005 and U.S. Provisional Patent application Ser. No. 60/712,320 entitled METHODS AND DEVICES FOR INTERWORKING OF WIRELESS WIDE AREA NETWORKS AND WIRELESS LOCAL AREA NETWORKS OR WIRELESS PERSONAL AREA NETWORKS filed Aug. 29, 2005 the entirety of which is hereby incorporated by reference. This application is related to co-pending patent application Ser. No. 11/240,323 entitled, METHODS AND DEVICES FOR INTERWORKING OF WIRELESS WIDE AREA NETWORKS AND WIRELESS LOCAL AREA NETWORKS OR WIRELESS PERSONAL AREA NETWORKS and co-pending patent application Ser. No. 11/240,725 entitled, METHODS AND DEVICES FOR INTERWORKING OF WIRELESS WIDE AREA NETWORKS AND WIRELESS LOCAL AREA NETWORKS OR WIRELESS PERSONAL AREA NETWORKS, both filed on the same day as this application.

BACKGROUND

I. Field

The following description relates generally to wireless networks and, amongst other things, to seamless interworking of communication between wireless wide-area networks (WWAN), wireless local area networks (WLAN), and/or wireless personal area networks (WPAN).

II. Background

Electronic devices can include multiple communication protocols. For example, mobile devices have become multi-functional devices, frequently providing email, Internet access, as well as traditional cellular communication. Mobile devices can be equipped with wide area wireless connectivity, for example, utilizing either or both of the following technologies: third generation wireless or cellular systems (3G) or Institute for Electrical and Electronic Engineers (IEEE) 802.16 (WiMax) and other to-be-defined WWAN technologies. Meanwhile, IEEE 802.11 based WLAN connectivity is being installed in mobile devices as well. On the horizon, ultra-wideband (UWB) and/or Bluetooth-based WPAN local connectivity may also be available in mobile devices.

Other examples of multiple communication protocols in electronic devices include a laptop that may include a WPAN utilized to connect the laptop to a wireless mouse, wireless keyboard, and the like. In addition, the laptop may include a device which operates on any currently defined IEEE 802.11 protocols (IEEE 802.11a/b/g/i/e) or other to-be-defined protocols in the IEEE 802.11 family (e.g., IEEE 802.11n/s/r/p). WLAN has become popular and, for example, is being set up in both homes and enterprises for personal and business purposes. In addition, coffee shops, Internet cafes, libraries and public and private organizations utilize WLANs.

WWAN technologies are distinguished by wide area (ubiquitous) coverage and wide area deployments. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

The number of networks and protocols continues to increase rapidly due to demands for functionality associated with unique user demands and divergent protocols. Such disparate networks and protocols are laborious for a user to switch between and in many cases the user is trapped in a network without regard to what might be the optimal network for the user at a given time. In view of the foregoing, there is a need to provide for seamless transition between networks and/or protocols for optimizing and converging on the best communication protocol for the user.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description presented later.

As individuals migrate through a plurality of different type of networks and protocols, the embodiments herein provide for seamless transition of a user through the various networks and protocols in order to facilitate smooth, seamless communication. Embodiments provide various optimization technologies to transition between the various networks and protocols and this transition can be based on a user preference, user location, signal strength, and/or other criteria. Such a seamless transition can be transparent to the user or can be user initiated.

According to a feature is a method for utilizing time-based information to improve communication in a wireless network. The method includes receiving beacon information from at least one access point and utilizing time-stamp information associated with the beacon information to determine whether to hand off communication with a second access point. According to another feature the method can include detecting beacon quality is below a threshold level, transmitting a poor beacon quality message, and receiving information relating to a plurality of alternate access points in response to the transmitted poor beacon quality message.

According to another feature is a method for performing a handoff in a wireless network. The method can include detecting the presence of a WWAN access point and a WLAN access point and associating a beacon timing with a plurality of beacons received from each access point. The method can also include ascertaining whether to transfer between the WWAN and the WLAN based at least in part on the associated beacon timing. Ascertaining whether to transfer between a WWAN and a WLAN can further include determining if bandwidth of the WWAN or WLAN is sufficient to accommodate an application of a mobile device.

Yet another feature is a mobile device that includes a memory that stores a requirement relating to a device application and a processor that analyzes information stored in the memory and determines if a network satisfies the device application requirement based in part on beacon timing. A handoff between a WLAN and a WWAN can be recommended. The mobile device can further include a WLAN component configured to generate a time stamp associated with a plurality of beacons received at the mobile device. Also included in mobile device can be a WWAN component coupled with the WLAN component. The WWAN component can be configured to generate signals indicating the timing of beacons received at WLAN component to the WWAN.

According to yet another feature is an apparatus for enhancing network communication through time-based information. The apparatus can include means for generating a time stamp associated with a plurality of beacons received from at least one access point and means for deciding whether to switch to a second access point based at least in part on the time stamps associated with the plurality of beacons received. According to another feature, the apparatus can include means for managing a handoff schedule to accommodate an application of the apparatus.

According to yet another aspect is a computer-readable medium having stored thereon computer-executable instructions. The medium can include receiving beacon information from one or more access points and associating an arrival time-stamp with the beacon information utilizing a Global Positioning System (GPS) functionality. The medium can further utilize the timestamp beacon information to determine a handoff management schedule between a WWAN, WLAN or WPAN.

Yet another aspect is a processor that executes instructions for seamless switching between WWAN and WLAN. The instructions can include receiving a beacon from an access point, associating a time of receipt with the beacon, and detecting a beacon quality level. The beacon quality level can be transmitted with the associated receipt time to a management system and a decision can be made whether to switch between a WWAN and a WLAN based on information received from the management system in response to the transmitted beacon quality level and associated beacon time of receipt.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
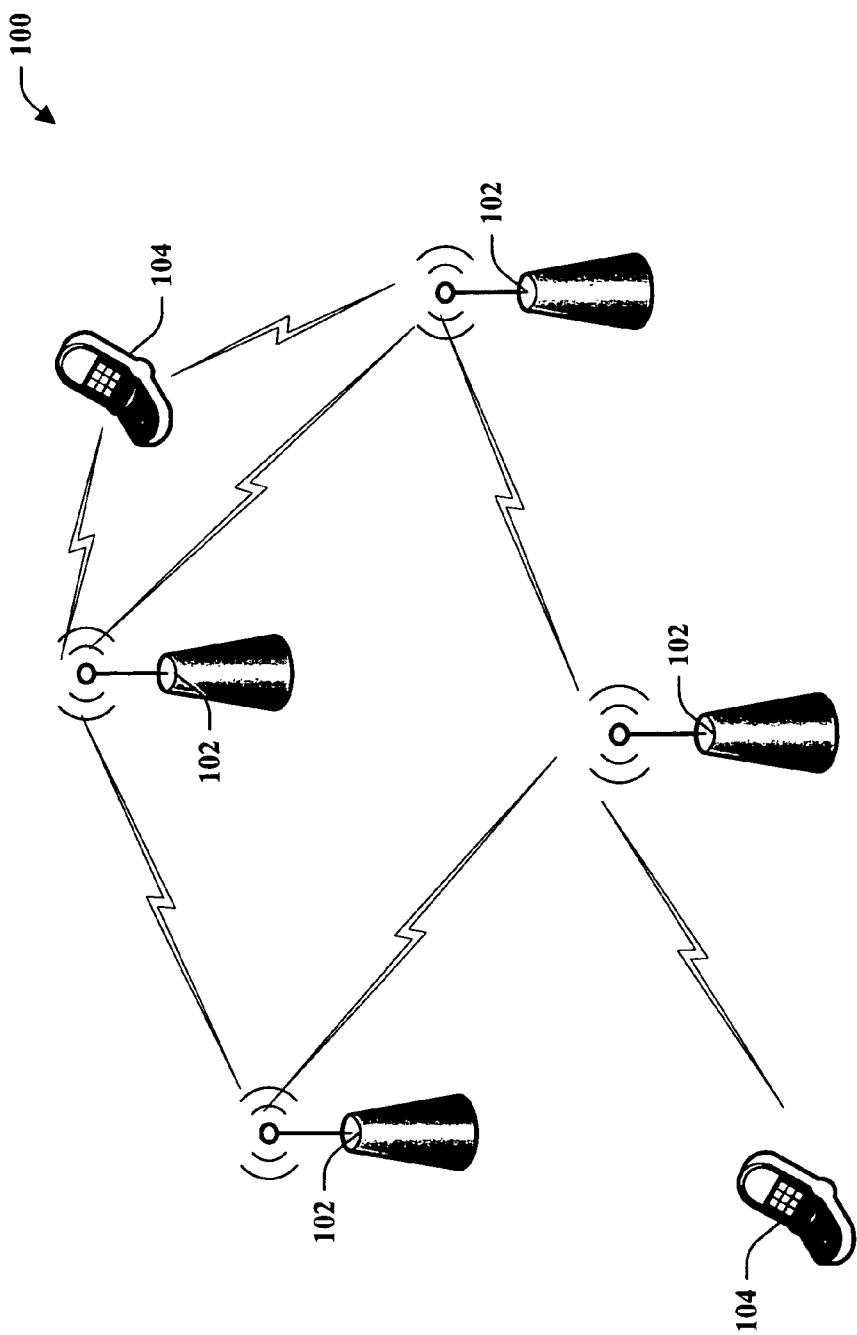
FIG. 1 illustrates a wireless communication system in accordance with various embodiments presented herein.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The disclosed embodiments can incorporate various heuristic and/or inference schemes and/or techniques in connection with dynamically changing networks or communications protocols employed. As used herein, the term "inference" refers generally to the process of reasoning about or inferring states of the system, environment, and/or user from a set of observations as captured though events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Accordingly, it is contemplated that users can be automatically shifted or outside of and into different communications regions in accordance with the embodiments described herein. Automatic action (e.g., seamlessly transitioning a user during a communication session from a WWAN to a WLAN) can be taken as a function of inferring a user's intentions with respect to handling of the communications session as well as tertiary communications, passive/background communications, and upcoming sessions. With respect to taking automatic action, machine learning techniques can be implemented to facilitate performing automatic action. Moreover, utility based analyses (e.g., factoring benefit of taking correct automatic action versus costs of taking incorrect action) can be incorporated into performing the automatic action. More particularly, these artificial intelligence (AI) based aspects can be implemented by any suitable machine learning based technique and/or statistical-based techniques and/or probabilistic-based techniques. For example, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, . . . are contemplated and are intended to fall within the scope of the hereto appended claims.

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a wireless communication system 100 in accordance with various embodiments presented herein. System 100 can comprise one or more access point(s) 102 that receive, transmit, repeat, etc., wireless communication signals to each other and/or to one or more mobile devices 104. Access point(s) 102 can represent an interface between wireless system 100 and a wired network (not shown).

Each access point 102 can comprise a transmitter chain and a receiver chain, each of which can in turn comprise a plurality of components associated with signal transmission and reception (e.g., processors, modulators, multiplexers, demodulators, demultiplexers, antennas, . . . ). Mobile devices 104 can be, for example, cellular phones, smart phones, laptops, handheld communication devices, handheld computing devices, satellite radios, global positioning systems, PDAs, and/or other suitable devices for communicating over wireless system 100. In wireless system 100, the periodic transmission of small data packets (commonly referred to as beacons) from access point 102 can make known the presence of wireless system 100 and transmit system 100 information. Mobile devices 104 can sense the beacons and attempt to establish a wireless connection to access points 102 and/or to other mobile devices 104.

System 100 facilitates seamless transition through various networks and/or protocols to provide a user using mobile device 104 the ability to take advantage of the available networks and protocols. System 100 also automatically affords the user the opportunity to utilize the best network and/or protocol given the current location or data usage of the user as well as other users of the network.

A component located in mobile device 104 can operate in conjunction with one or more access point 102 to facilitate monitoring which user is in each network and can be facilitated though a GPS component and/or WWAN component associated with mobile device 104. Alternatively or in addition, location information can be provided from a WLAN access point to a WLAN component associated with a mobile device that does not include a GPS or other location component(s). The location information can be provided to mobile device(s) that do not have location capabilities through location information obtained through GPS or WAN capable multi-mode access terminal(s) that are in proximity or communication with access point 104 (including receiving and transmitting beacons).

The location information can be utilized to predict which user is best suited to have a transparent handoff to a secondary network. For example, in an open area mall a user can be using mobile device 104 connected to a general wideband network. Mobile device 104 can seamlessly switch to Bluetooth, a narrower band, etc. as the user approaches a specific merchant. The network to which the mobile device is switched can be a function of the content which the user desires pushed or pulled to mobile device 104.

Since the merchant networks can overlap due to dynamics of a shopping mall, mobile device 104 can seamlessly switch between the various merchant networks autonomously without interaction from the user. System 100 allows the networks to cooperate with each other and handoff mobile device 104 from one network to another. This can be accomplished with a GPS component that can monitor the location of the user and the desired content to be pushed/pulled to the device.

Figure 2:
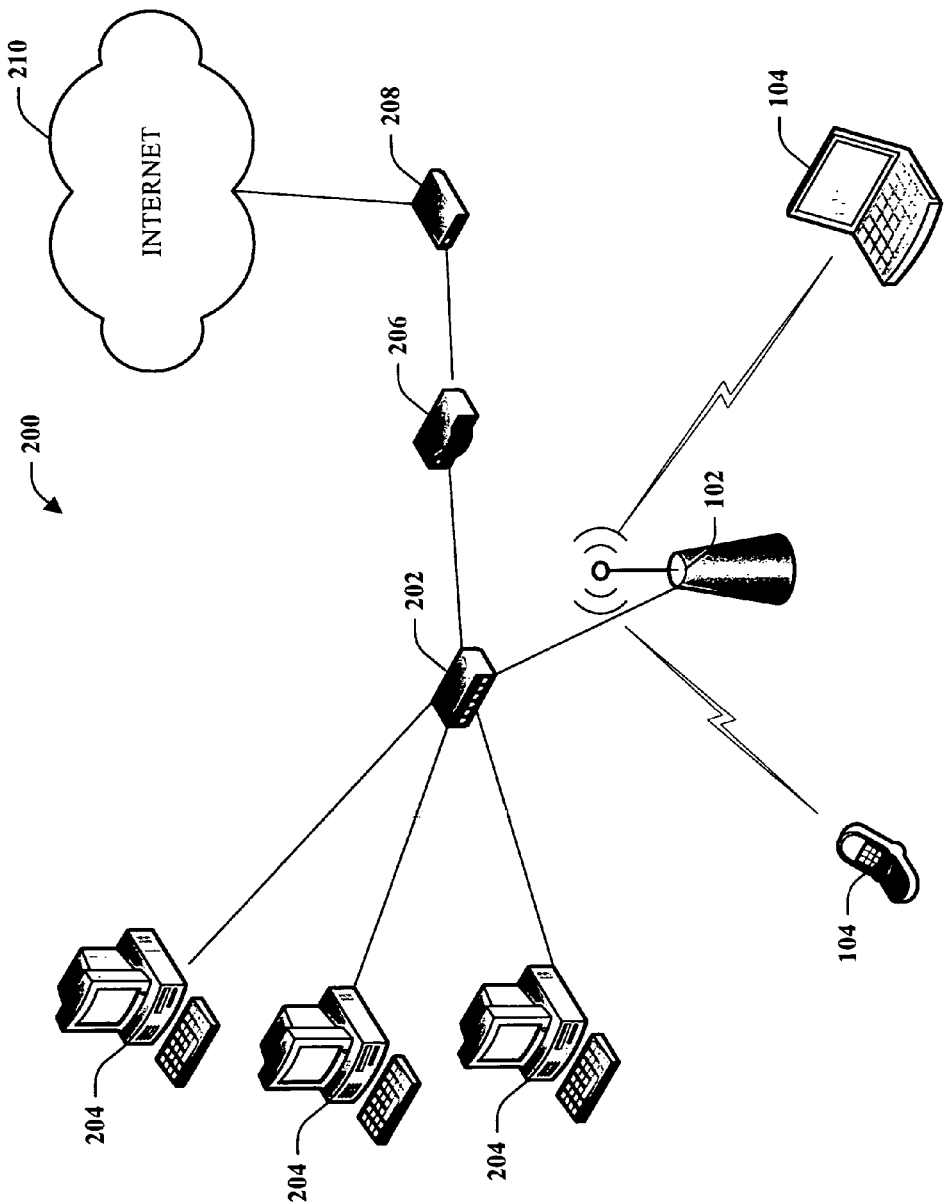
FIG. 2 is an illustration of a multiple access wireless communication system according to one or more embodiments.

FIG. 2 is an illustration of a multiple access wireless communication system according to one or more embodiments. Illustrated is a system 200 that includes a WLAN associated with a wired local area network (LAN). Access point 102 can be in communication with mobile devices 104. Access point 102 is connected to an Ethernet hub or switch 202 for a LAN. Ethernet hub 202 may be connected to one or more electronic devices 204 that can include personal computers, peripheral devices (e.g., facsimile machines, copiers, printers, scanners, etc.), servers, and the like. Ethernet hub 202 can be connected to a router 206 that transmits data packets to a modem 208. Modem 208 can transmit data packets to a wide area network (WAN) 210, such as the Internet. System 200 illustrates a single, simple network configuration. Many additional configurations of system 200 including alternative electronic devices are possible. Although system 200 has been illustrated and describe with reference to a LAN, it is possible that system 200 can utilize other technologies including WWAN and/or WPAN either separately or concurrently.

System 200 can facilitate mobile device 104 seamlessly switching between an access point currently being utilized by mobile device 140 to assess point 102 associated with system 200. Such transfer to access point 102 and to the network supported by access point 102 can be selected to provide user of mobile device 104 a sought after functionality and can be a function of the mobile device 104 location or the data the user desires to access or upload to mobile device 104. By way of example and not limitation, the wireless device can be coupled to electronic device(s) 204 to utilize the WWAN and/or WLAN functionality available through the electronic device(s) 204. Such a transition can be user initiated or performed autonomously by system 200.

Figure 3:
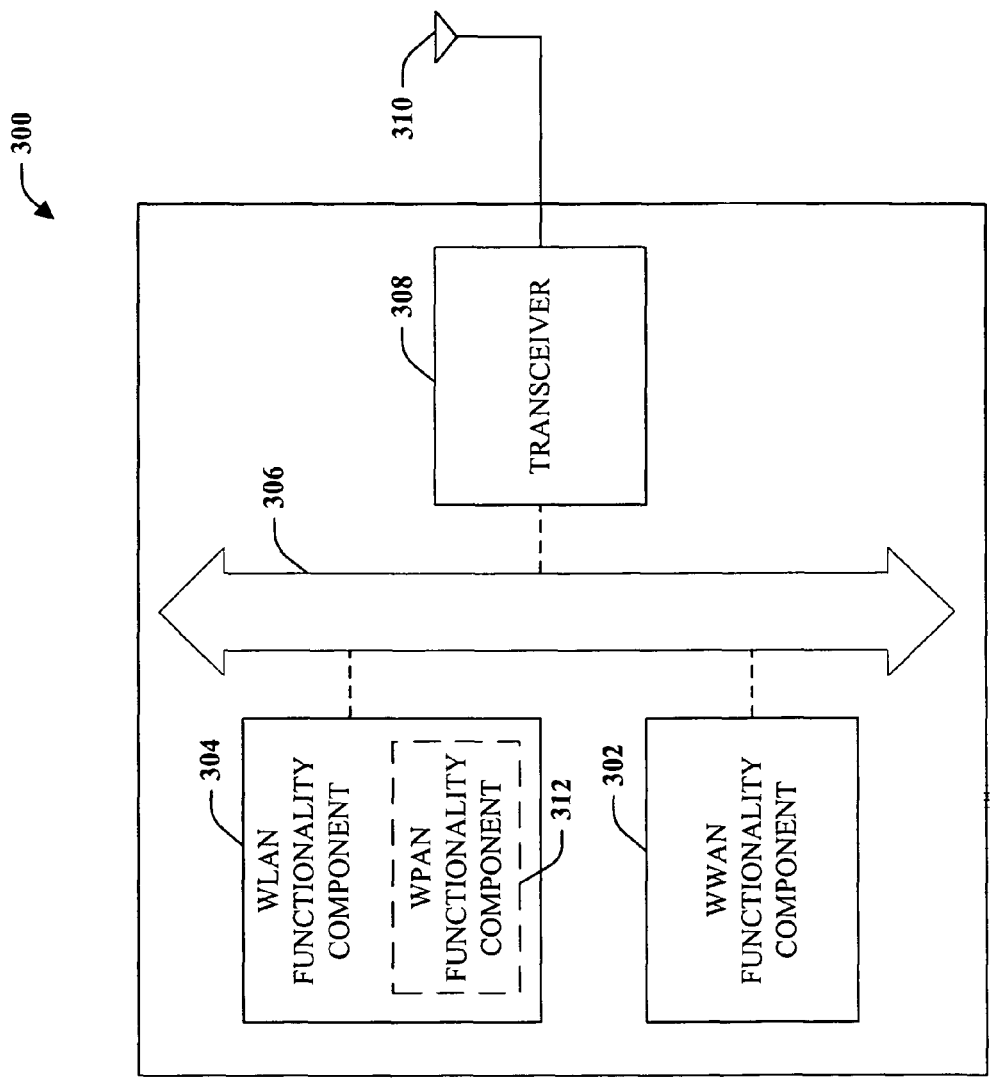
FIG. 3 is a block diagram of an embodiment of a mobile device.

FIG. 3 illustrates a simplified block diagram of an embodiment of a mobile device 300. Mobile device 300 can include WWAN (e.g., Code-Division Multiple Access (CDMA), which is a technology that utilizes spread-spectrum techniques), WLAN (e.g., IEEE 802.11) and/or related technologies. Mobile device 300 can be utilized as a Voice Over Internet Protocol (VoIP) phone. VoIP includes the transmission of voice telephone conversation through the Internet and/or through IP networks. VoIP can be utilized by mobile device 300 at home or when it is in vicinity of a wireless access point (WAP) connected to a broadband network that provides VoIP services. In other situations, mobile device 300 can work as a regular wireless mobile phone while providing communication services.

In an embodiment, a WWAN component 302 that provides WWAN functionality and a WLAN component 304 that provides WLAN functionality are located together and are capable of communication with a transceiver 308 through a bus 306 or other structures or devices. It should be understood that communication means other than busses could be utilize with the disclosed embodiments. Transceiver 308 is coupled to one or more antennas 310 to allow transmission and/or reception by mobile device 300. WLAN component 304 can generate voice data provided to transceiver 308 for communication. In an embodiment, WWAN functionality component 302 and/or WLAN functionality component 304 can be included in a processor of mobile device 300. In another embodiment, WWAN functionality and WLAN functionality can be provided by distinct integrated circuits. In a further embodiment, WWAN functionality and WLAN functionality can be provided by one or more integrated circuits including functionality that is utilized by both. Mobile device 300 is equipped with connectivity options for the wide area (WWAN) and local area (WLAN and WPAN) to allow a rich combination of services and user experiences.

Figure 4:
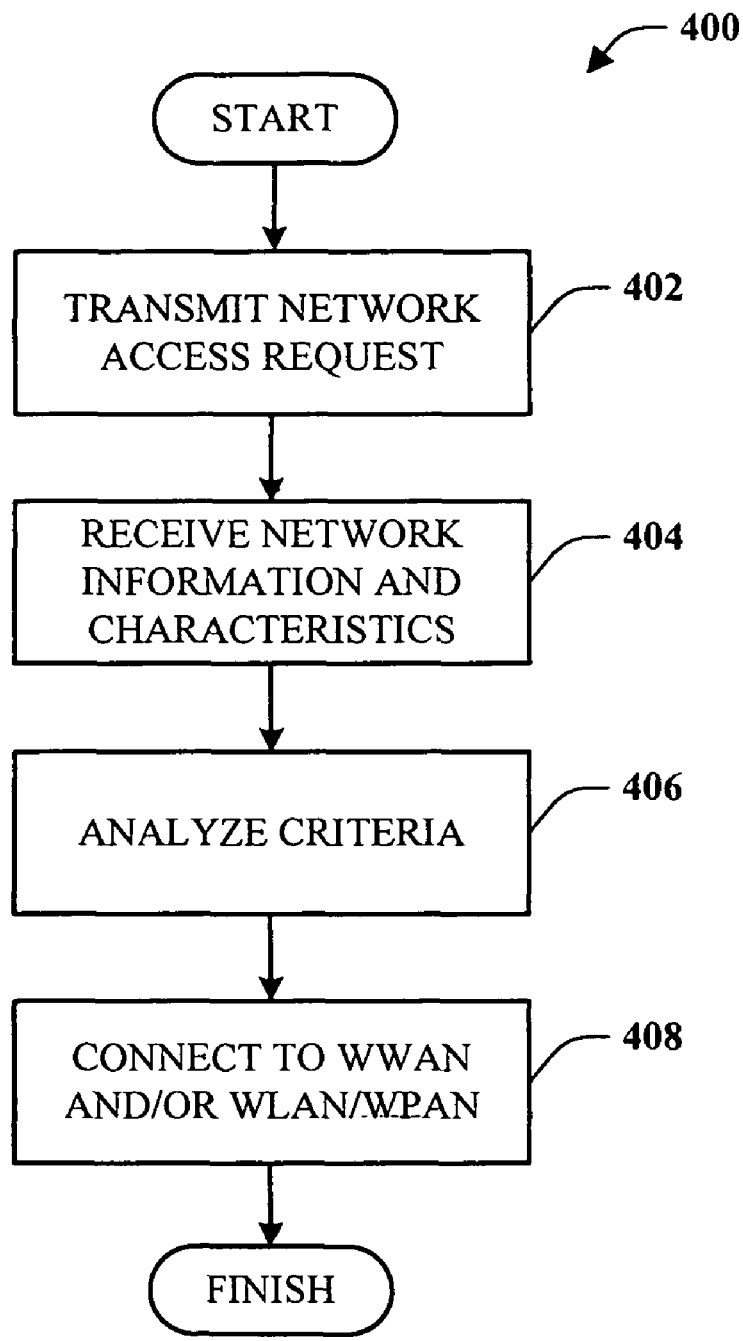
FIG. 4 illustrates a methodology for determining the type of network to which the mobile device should connect.

The WLAN functionality component 304 can include an optional WPAN functionally component 312. Mobile device 300 can connect to either the WWAN or WLAN and WPAN, or to both simultaneously, based upon one or more criteria that relates to functions of the mobile device. The criteria can be stored in a memory of the mobile device and a processor can analyze a network based on the stored criteria. These criteria and related connection determination are described with reference to FIG. 4, which illustrates a methodology 400 for determining the type of network to which mobile device should connect. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

The method starts at 402 with a request by mobile device to access a network. The network can be a WWAN, a WLAN, and/or a WPAN. When the request is sent one or more access points associated with the network(s) can receive the request and respond with network information that can include characteristics of each network. For example, mobile device can receive network type information, bandwidth information, cost of service, available applications, signal strength, number of identified access points, etc.

At about the same time as receiving the network information, mobile device can analyze certain criteria, at 406, in order to make a determination as to what network connection will provide the best results for the user of mobile device. For example, the criteria can include the bandwidth available to the mobile device based upon bandwidth necessities of the application(s) being utilized by the mobile device or applications to be downloaded to the mobile device. In other embodiments, the criteria can be the cost to the user of mobile device of the WWAN and/or WLAN (e.g., the lowest cost service provider). In a further embodiment, the determination can be based upon the application(s) available using the WWAN and/or the WLAN. In additional embodiments, the criteria can be the best coverage available to the mobile device in its current location (e.g., based upon signal strength or number of identified access points for the WWAN and/or the WLAN). Other embodiments can combine one or more of the above-identified criteria as well as other criteria that can be defined by the user of mobile device or by the service provider. The criteria can be embodied in the WWAN functionality component, WLAN functionality component, both the WWAN functionality component and WLAN functionality component or another controller residing in the mobile device.

Based upon the criteria analyzed, at 406, mobile device can connect, at 408, to the WWAN or the WLAN and WPAN separately. In a further embodiment, mobile device can connect to both the WWAN and WLAN and WPAN simultaneously. The determination whether to connect separately or simultaneously is based upon the analyzed criteria and the best connection possible to satisfy the one or more criteria.

The interworking between the WWAN and WLAN (and WPAN) can involve multiple wireless networking providers, multiple service providers and databases of available connectivity options by location, or other heterogeneous network topologies. For example, the WWAN service provider may maintain an up-to-date database of available networking and services by location as new access points are added by network service providers or private entities for WLAN and/or WPAN functionality (e.g., access points provided by private companies or the like). Moreover, in some embodiments, the WWAN can extend its connectivity by exploiting the presence of a WLAN and/or WPAN multi-hop mesh that is not established by a service provider. In a multi-hop mesh network, small nodes that act as simple routers can be installed. Each node then transmits a low power signal that can reach other nearby nodes. These nearby nodes transmit to another node that is nearby. This process can be repeated until the data reaches its final destination.

The combination of these technologies in mobile devices enables new types of usage models and services that are not available from each technology (WWAN, WLAN, and/or WPAN) individually. These applications created by the interactions between WWAN and WLAN technologies can be classified into a number of areas. For example, these technologies can be classified into location-based services, timing based services, and/or topology based services. Location based services can include emergency situations where the location of a mobile device user needs to be ascertained to provide such emergency services, however the embodiments described herein are not limited to emergency services. For example, users of mobile devices (end user) may desire location based billing services. These types of services include those services in which users are billed at different rates depending upon the location of the user. For example, the user might have one rate if the user is at home and a different rate when the user is in the office (or other work place) or at an Internet kiosk or café. In another embodiment, location information can be utilized to provide multimedia content that can be downloaded to the mobile device. This multimedia content can be location dependent based upon whether the user is in a sports stadium or a shopping mall for which different multimedia content can be provided.

Figure 5:
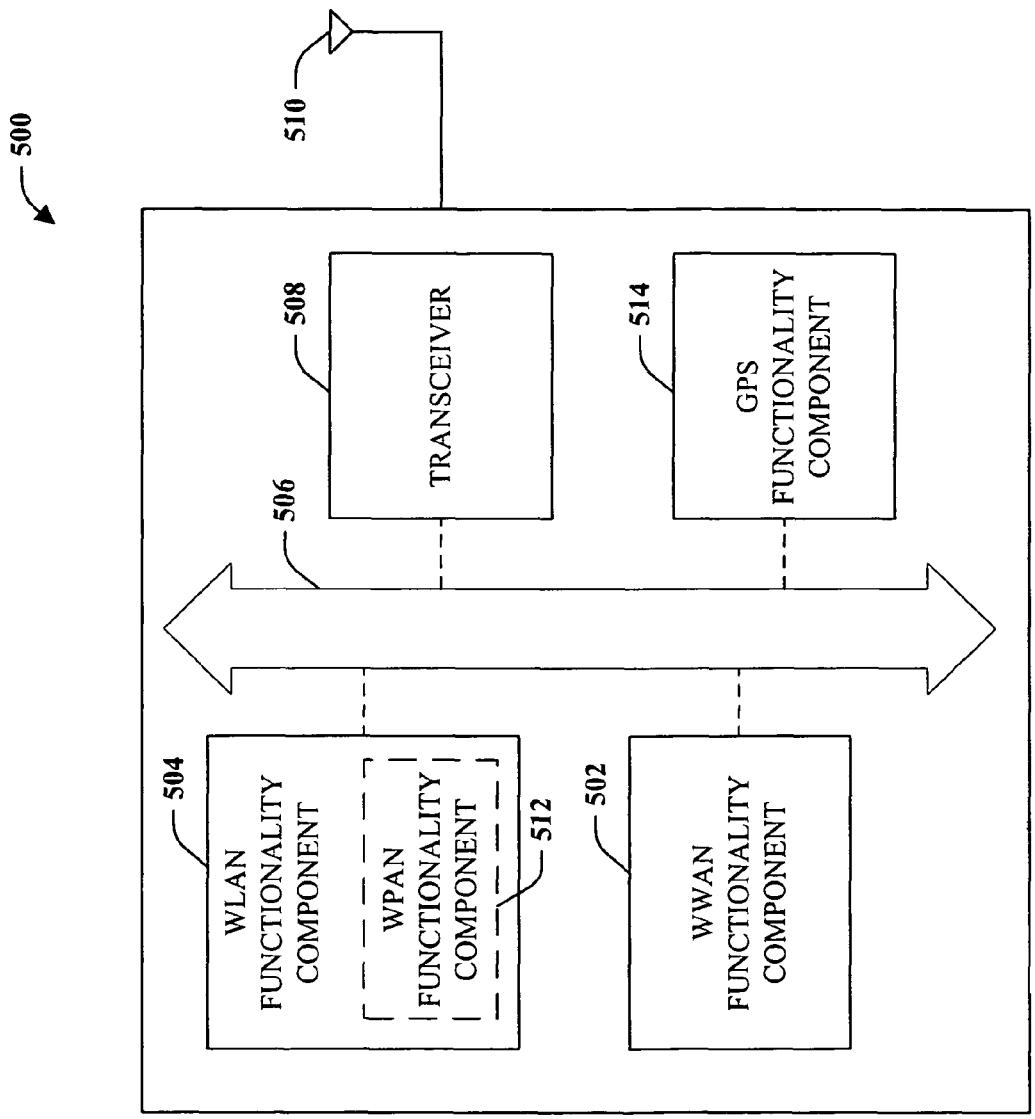
FIG. 5 is a simplified block diagram of another embodiment of a mobile device.

Referring now to FIG. 5, illustrated is a simplified block diagram of another embodiment of a mobile device 500. In an embodiment, WWAN component 502 that provides WWAN functionality and WLAN component 504 that provides WLAN functionality are located within mobile device 500 and are capable of communication with transceiver 508 through a bus 506 or other structures or devices. Transceiver 508 is coupled to one or more antennas 510 to allow transmission and reception by mobile device 500. The WLAN functionality component 504 can include an optional WPAN functionality component 512. In addition, a Global Positioning Service (GPS) functionality component 514 can be provided to allow for positional and/or timing based functionality. A number of applications utilizing the position or location information and timing based functionality can be provided.

For example, in a retail mall or shopping center (indoor and/or outdoor), retail establishments may have access points that are maintained by the same or different service providers. As a user walks around the mall, different access points may pick up the user at the same time. Since there may be some overlap of the WLANs because of the location of the retail establishments, the precise or an approximate location of the user can be established through a GPS component or other locating means. If the user is close to a music store or video kiosk, etc. the user can receive an offer from the retail establishment to buy a movie or music. The retail establishment can recommend the offer by utilizing the location of the user, since the system(s) know where the user is located. The offer can also be based on a user preference that was previous established by the user, either internally in the mobile device or externally by the service provider. The user can chose to take advantage of the offer or to reject the offer. It is to be understood that if a user preference is known, certain retail establishments can be prevented from offering unwanted services to the user.

If the user chooses to download a movie, for example, the user can access a WAN and pay for the movie with a credit card and/or a pre-established payment method (e.g., e-wallet). After confirmation of the payment, the user can receive the selected movie along with the rights, management, and other features associated with owning the particular movie. Different networks may be used to deliver the rights and the content. In one scenario, the rights may be delivered using a WWAN while the content itself is accessed through the WLAN. The actual service (e.g., movie) can be accessed through the WLAN or WWAN, depending on the requirements. A DVD, for example, can be downloaded to the mobile device through the WLAN because of the data throughput. Determination of which functionality to utilize to upload the data can be decided by a WWAN component that provides WWAN functionality, a WLAN component that provides WLAN functionality, or a combination of both a WWAN component and a WLAN component. The determination can also be made by a controller or processor associated with the mobile device.

Figure 6:
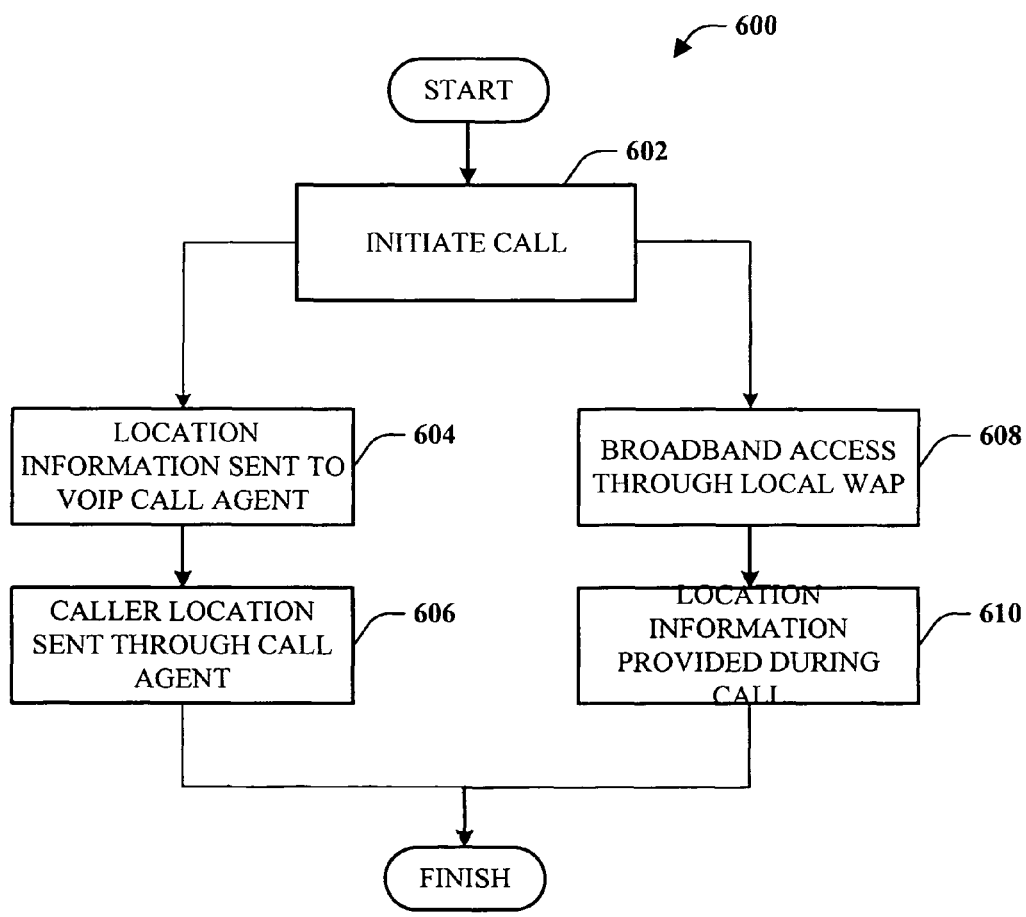
FIG. 6 illustrates a methodology for locating a call received from a user of a mobile device that utilizes a GPS functionality component.

FIG. 6 illustrates a methodology 600 for locating a call received from a user of a mobile device that utilizes a GPS functionality component. The method begins at 602 when a call is initiated by user of mobile device. This call can be an emergency phone call (e.g., 911 call) or it can be a call that is non-emergency. In an embodiment, when the call is initiated, at 602, a signaling message based on a session initiation protocol (SIP) can carry the location information supplied by the GPS functionality component. The SIP is a signaling protocol that can be utilized for initiating, modifying, and terminating an interactive user session that can include optional multimedia elements, such as Internet conferencing, telephone, event notification, video, instant messaging, online games, and/or virtual reality. The location information can be carried, at 604, to a VoIP Call Agent, for example. Thus, if an emergency situation arises, the VoIP call agent has the location information and knows the location of the caller. The VoIP call agent can supply this information to the appropriate agencies, at 606. This is useful when the caller does not know the calling location and/or cannot communicate such information to the call recipient.

In another embodiment, the call can be made outside the coverage area of the user's home network/WLAN. For example, the WLAN AP may be located in a user's home and the user may be talking on a mobile phone in such user's backyard. As the user is talking the user may be walking around and wander (intentionally and/or unintentionally) onto the coverage area serviced by a different WLAN. In another embodiment, the user may take the mobile phone to a distant location (e.g., friend's house, relative's house, school).

In another embodiment, a call is initiated, at 602. If the mobile device is in a location that has broadband access through a wireless access point (WAP), the mobile device utilizes such broadband access, at 608. The location of the mobile device can be provided, at 610, during the call, through a transceiver that can transmit the location information obtained utilizing the WWAN interface of the device. Voice data, generated by a WLAN functionality, can be provided to the transceiver for communication that is sent with the location information. This methodology can be utilized, for example, in a school or educational setting where a child can use a handset to make an emergency (or non-emergency) call. The handset can take advantage of the broadband access provided by the school and/or other facility to locate the user (child) and provide the information to the call recipient (e.g.

police, fire department). Thus, the child (or other person) can be located without such child needing to communicate location information.

Figure 7:
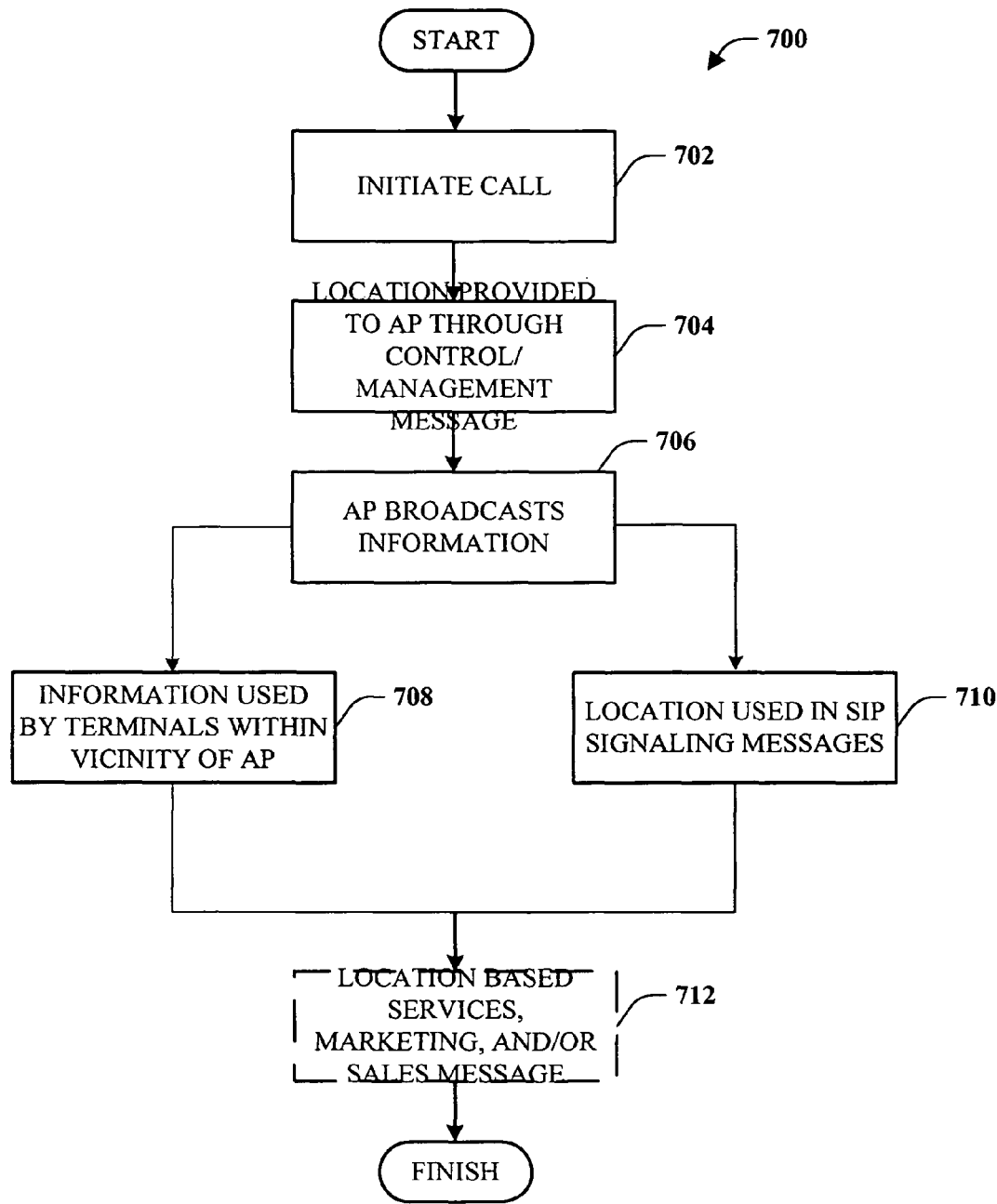
FIG. 7 illustrates another methodology for locating a wireless device (e.g., mobile phone) that does not utilize a GPS receiver.

With reference now to FIG. 7, illustrated is a methodology 700 for locating a wireless device (e.g., mobile phone) that does not utilize a GPS receiver or GPS component that provides GPS functionality. Single mode access terminals are those that have a single functionality such as WLAN or WPAN. For example, mobile phones that handle VoIP in a home generally do not utilize embedded GPS technology. However, in some situations (e.g., emergency) it may still be important to determine the location of a mobile device that does not have GPS technology. Even when the device is away from the home because the user has transported the device to a different location (e.g., educational facility, friend's house), the location of the device can still be determined. This determination can be based upon the known location of other device(s) that are in the vicinity of the mobile device that does not utilize GPS technology. The vicinity may include the same access point and/or access points within a certain geographic area of the access point utilized by the mobile phone without GPS technology.

The location determination begins, at 702, when a call is initiated by a user of a mobile device without GPS technology. The mobile device contacts an access point to place the call. The access point can have a listing or concurrently receive information from dual mode device(s) (e.g., one that utilizes WLAN, WPAN, and/or GPS functionality). The dual mode device(s) can provide its location information to the access point or to other WLAN stations (user terminals) depending on the mode of operation (infrastructure or ad-hoc) through a control or management message. The access point that has the location information from the dual access terminal can broadcast this information in an infrastructure network. Other user terminals in the vicinity of the access point can use the information for location management, at 708. VoIP access terminals can use the location information in SIP signaling messages to indicate location information, at 710. The location information can be utilized for location-based services and/or for providing marketing and/or sales messages to the mobile device(s), at 712. If a user is in a retail outlet, such as an outdoor or indoor mall, the location information can also be utilized to provide the user of mobile device information regarding particular retail information. It should be understood that marketing and/or advertising is optional, as shown by the dotted lines, and may not be utilized with the disclosed embodiments.

The location of a user that is inside a building can be roughly approximated because the user enters the building from a particular place, which is the user's last known coordinate. The last known coordinate can be latched or maintained by the access terminal until such time as the user exits the building and a GPS functionality and/or other locating means can be utilized to establish the new location. When the user exits the building or structure, the access terminal will acquire its current position though the GPS or other locating means. In addition, there can be a plurality of users who enter the building and the last known coordinate of each user can be combined to construct a range determination for a particular access point (WLAN) and/or base station (WAN). The access point (WLAN) can determine its position with respect to the base station (WAN) and/or with respect to any devices that feedback location information to the access point. Thus, even thought the access point might not have a means to determine its own location, the location information is provided through the mobile devices that access that access point.

Figure 8:
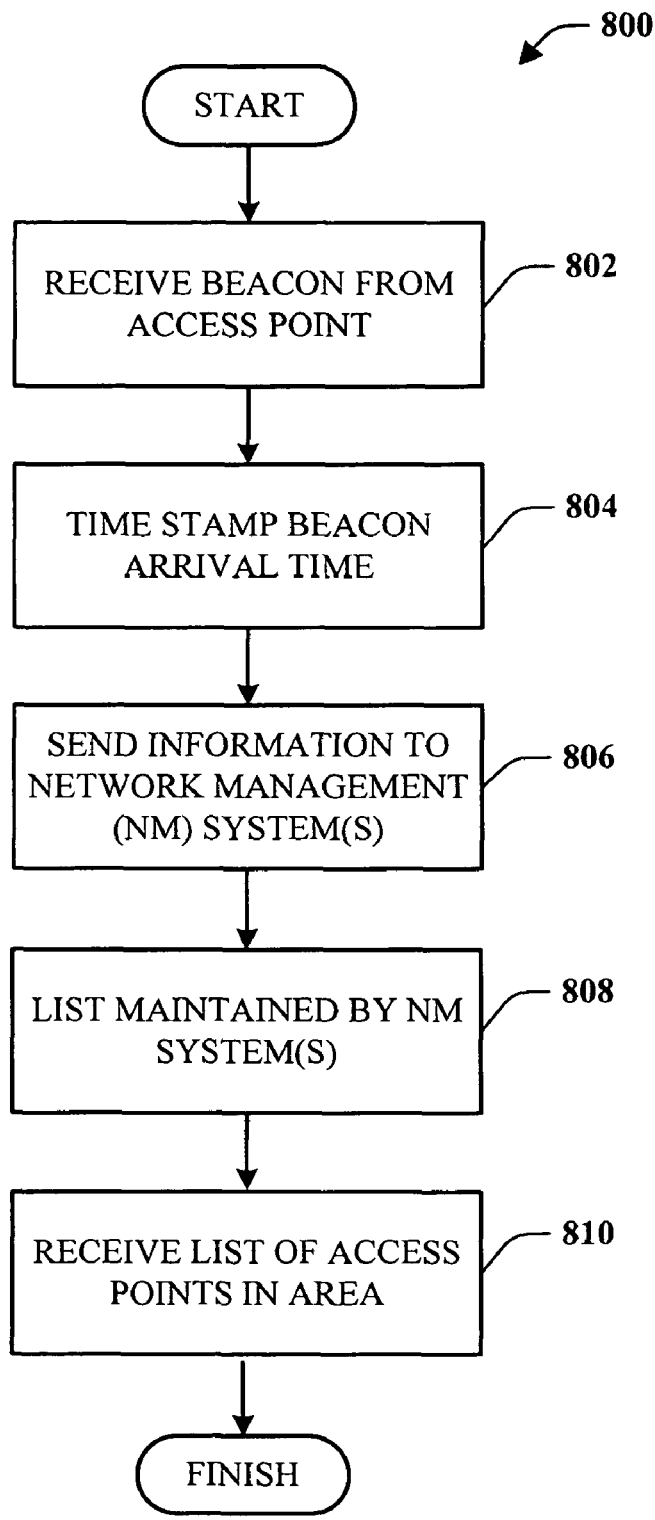
FIG. 8 illustrates a methodology for utilizing access points within a WWAN, WLAN, and/or WPAN network.

FIG. 8 illustrates a methodology 800 for utilizing access points within a WWAN, WLAN, and/or WPAN network. A mobile device having WWAN and WLAN and/or WPAN functionality can receive accurate network timing from, for example, a GPS receiver that can be located on the mobile device or through the pilot signaling of a WWAN. This timing can be utilized for Quality of Service (QoS) and/or handoff management. A mobile device in the region and/or vicinity of hot spots or multiple access points can receive a beacon from an access point, at 802. Upon receipt of the beacon, the mobile device can time stamp the arrival time of the beacon, at 804, utilizing internal GPS functionality or relative to the WWAN timing obtained through the WWAN interface. The beacon information can include an access point identifier, access point location, current network load at the WLAN AP, etc. The stamped arrival time and other information can be sent by the mobile device to a Network Management (NM) system, at 806, through, for example, a WWAN link. The NM system maintains a list of the access points and/or arrival times, at 808. This information can be maintained by a database or memory associated with the NM system. The NM system for the WWAN and/or WLAN, for example, maintains a list of the detected access points in the area of the WLAN/WPAN, the channels the access points are using and/or their beacon transmission time, and the current load at each AP. The user can utilize this information in selecting an appropriate AP and/or network to join.

The NM system can send the mobile device, at 810, a listing of the access points in the area to which the mobile device can connect. The access point listing can include respective channels and/or beacon transmission times and the current load at the access points as well as other information collected and maintained by the NM system, at 808.

In another embodiment, the mobile device (e.g., access terminal) can tune to each of the access points at beacon times and measure the received channel quality information (e.g., SNR). The mobile device can share the information about the link quality of the current network and other networks with the current AP. This information can be passed to the NM system, at 808, and can be made accessible to other users. In such a manner, handoff management for WLAN/WPAN can be provided. In addition or alternatively, this information can be broadcast by each access point through specific signaling and/or through an information element beacon. The information element beacon can be utilized by the mobile device(s) in the vicinity of the access point to update the NM system or neighborhood network information.

Figure 9:
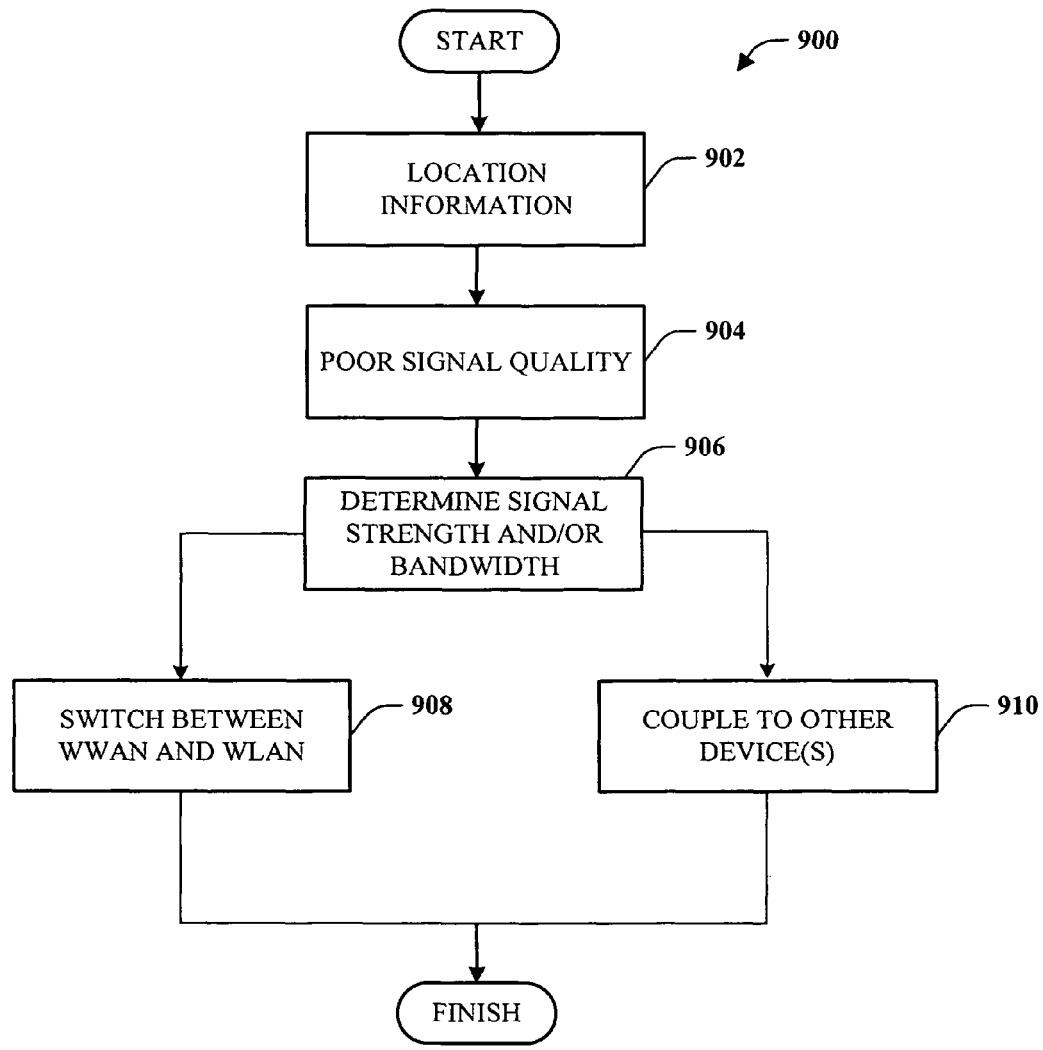
FIG. 9 illustrates a methodology for utilizing location information to seamlessly switch a mobile device between WWAN and WLAN/WPAN.

In another embodiment, location information can be utilized to seamlessly switch the mobile device between the WWAN and WLAN/WPAN, as illustrated in the methodology 900 of FIG. 9. The method begins, at 902, where location information of a mobile device can be made available through a GPS functionality component or other locating means (e.g., triangulation, location of other devices in the vicinity, . . . ). At 904, an indication that the signal quality available through a WWAN is poor can be sent to the mobile device. For example, the mobile device can indicate that a particular bandwidth and/or signal strength should be available to carry out a particular function and/or satisfy the requirement/quality of service for a particular link for that device and if the link conditions do not meet these requirements and/or quality level, a message can be sent to and/or generated by mobile device. The information regarding system requirements (e.g., bandwidth, signal strength, . . . ) can be stored in a memory of the mobile device and may be based upon information provided by a service provider and/or a user as it relates to one or more device application. A processor associated with the mobile device can analyze the stored information and determine if the system requirements are satisfied. If the requirements are satisfied, the device can connect to the current network. If the requirements are not satisfied, the device can search for a network that satisfies the device requirements.

For example, the WLAN functionality can detect, at 906, beacons and determine the signal strength and/or bandwidth available at the WLAN access point. This information can be utilized by the mobile device, through a WWAN and/or WLAN functionality component, at 908, for example, to make a determination to switch from WWAN to WLAN if the bandwidth and/or signal strength is superior on the WLAN than on the WWAN. The information can also be utilized to switch from WLAN to WWAN. It should be appreciated that the transition from WLAN to WWAN and/or WWAN to WLAN is seamless and the user of such device may not be aware that there has been a switch in the type of network.

In another embodiment, the signal strength and/or bandwidth determined, at 906, can be utilized to couple with other devices, at 910. For example, if the mobile device allows connectivity with other devices, the mobile device can be coupled to those other devices. In such a manner, the mobile device utilizes the connection provided through the WLAN. By way of example and not limitation, the wireless device can be coupled to a computer to utilize the WWAN and/or WLAN functionality available through the computer.

Figure 10:
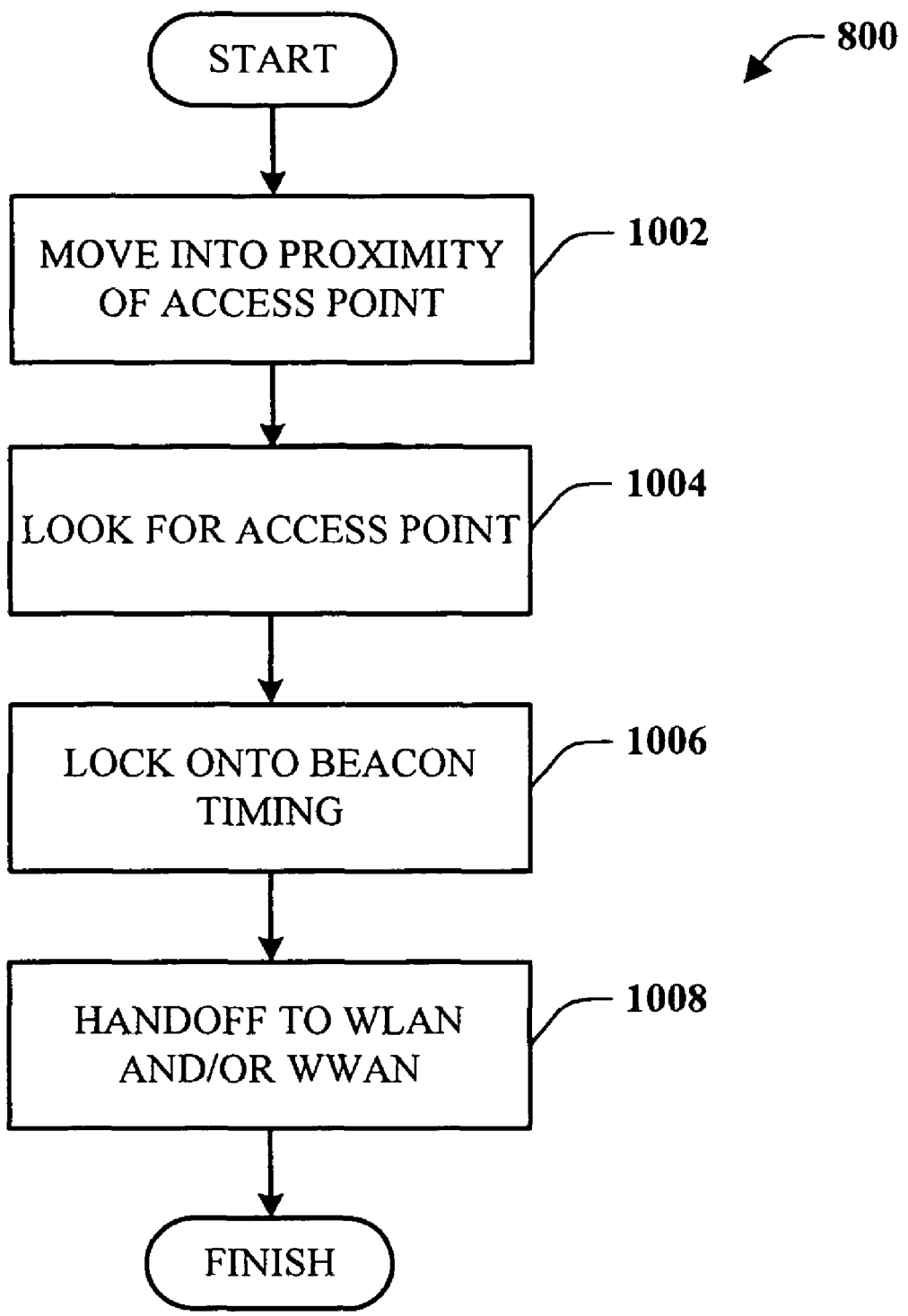
FIG. 10 illustrates another embodiment of a methodology for utilizing location information to automatically enhance service(s) of the mobile device.

FIG. 10 illustrates another embodiment of a methodology 1000 for utilizing location information to automatically enhance service(s) of the mobile device. For example, a video telephone call can start on an access terminal through a WWAN. Through, for example, insufficient bandwidth on the WWAN, the video and/or graphics resolution may be or become poor. Alternatively or in addition, a user can start the conference at an office and during the conference might desire to move to another location (e.g., home, coffee shop, library, . . . ). This includes the situation where a late-night call is placed to accommodate callers that are in different time zones. The call can start at one location and during the conversation either or both parties can move to a different location. The call can continue without interruptions as the user(s) change location and the mobile device can be seamlessly authenticated as it is moved through different access points and/or networks.

When the mobile device moves into the proximity of an access point (e.g., WWAN access point), at 1002, the location information provided by a GPS component or other locating means of the mobile device can be sent to a Network Management (NM) system. The NM system can prompt the access terminal to look for the access point, at 1004, and provide information about the WLAN APs present in the area, their operating channels and the beacon timings and other information. The access terminal can then search for an access point and can lock on to the beacon, at 1006, which can be the beacon timing provided by the NM system. At 1008, a handoff can be performed to switch the device from WWAN to WLAN and/or from WLAN to WWAN, for example. Since the WLAN is typically connected to a Broadband network, the call quality can be significantly improved if the call transmission is redirected to the WLAN. The resolution of video and graphics can be vastly improved and the mobile device (e.g., access terminal) can be attached to a computer display to take advantage of the high-resolution video call. This makes possible enhanced services, such as enhanced performance or performance in areas where access was previously unavailable.

Alternatively or in addition, in the IEEE 802.11n WLAN standard, time based scheduling can take place. For example, the access point can declare a schedule for transmission and/or reception of packets to/from the access terminals. The access terminals can receive packets at predetermined times and can then send packets when the time to send packets occurs. These schedules can be communicated and coordinated by a NM system through a WWAN signaling link. The NM system can allocate different access terminals to different access points along with the appropriate schedule information.

In a further embodiment, certain applications can have demanding jitter needs and may need to receive timing from the network. For example, in VoIP, jitter is the variation in time between packets arriving and can be caused by network congestion, timing drift and/or route changes. The accurate timing available at the mobile device can be utilized for applications with jitter needs. The access points and the mobile device can be driven from a network clock. If the access point does not have an accurate clock, the mobile device can provide timing to the access point, such as through a GPS component that provides GPS functionality. The access point can make this timing received from the mobile device available by access terminals that are not dual mode and/or that do not have timing functionality.

In a further embodiment, the WWAN and WLAN technologies can be utilized to construct self-configuring ad-hoc networks. Ad-hoc networks can operate in an infrastructure mode utilizing access points, or can be wireless networks that comprise only stations (e.g., mobile devices) but have no access points, or a network that utilizes both infrastructure mode (access points) and peer-to-peer mode. Ad-hoc networks can also be referred to as Independent Basic Service Set (IBSS) Networks.

Ad-hoc networks can have different properties depending upon the application scenarios. For example, in certain emergency scenarios (e.g., disasters) different agencies (e.g., fire, police, security, . . . ) might utilize different frequencies so that communications can be maintained with minimal interruptions. Therefore, these agencies may not be able to respond effectively or might have difficulty communicating with each other. Dual mode access terminals can provide low cost commercial systems that can address the needs of multiple agencies during emergency (and routine) situations.

Figure 11:
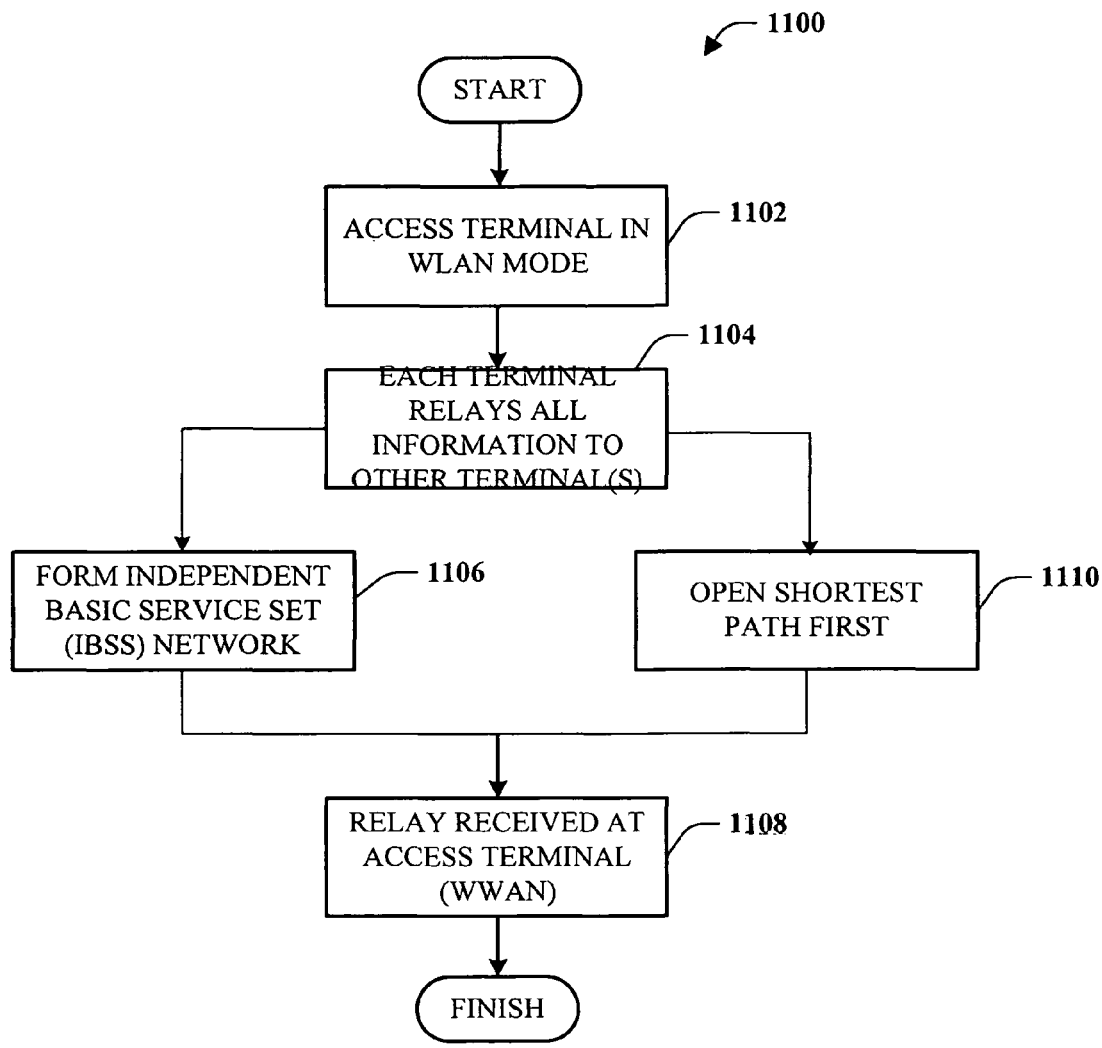
FIG. 11 illustrates a methodology of providing an ad-hoc network in situations where there is no available access point.

Referring now to FIG. 11, illustrated is a methodology 1100 for providing an ad-hoc network in situations where there is no available access point. This can be beneficial inside a building where emergency personnel, for example, have dual mode access terminals. The method begins at 1102 where the terminals located within a building or other contained area are in the WLAN mode. When a message is initiated at a terminal, the terminal relays all the information it has to access terminals within its vicinity. Each terminal that receives the information relays the information it has (both from the terminal user and from other terminals) to terminals within their respective vicinities, at 1104. This relay of information between the terminals forms the IBSS network, at 1106. The information, at 1108, eventually makes its way to an access terminal, which can also have a WWAN connection. Thus, a simple implementation in a rapidly changing emergency environment can be formed for the access terminals to broadcast the information it receives from the user of the terminal as well as other access terminals in its vicinity. While this can create a non-optimal utilization of bandwidth, it also provides sufficient redundancy allowing the information to eventually be transmitted out of the building and received by the appropriate recipient.

In an alternate embodiment, a more sophisticated implementation can use Open Shortest Path First (OSPF) type of protocol for route construction, as indicated at 1110. OSPF is an interior gateway routing protocol originally developed for IP networks. The protocol is based on the shortest part first or link-state algorithm that a router can use to send routing information to the nodes in a network. The shortest path to each node can be calculated based on a topography that includes the nodes. However, it should be noted that these protocols might take some time to converge and may not be suitable in environments where the topology is constantly changing.

Figure 12:
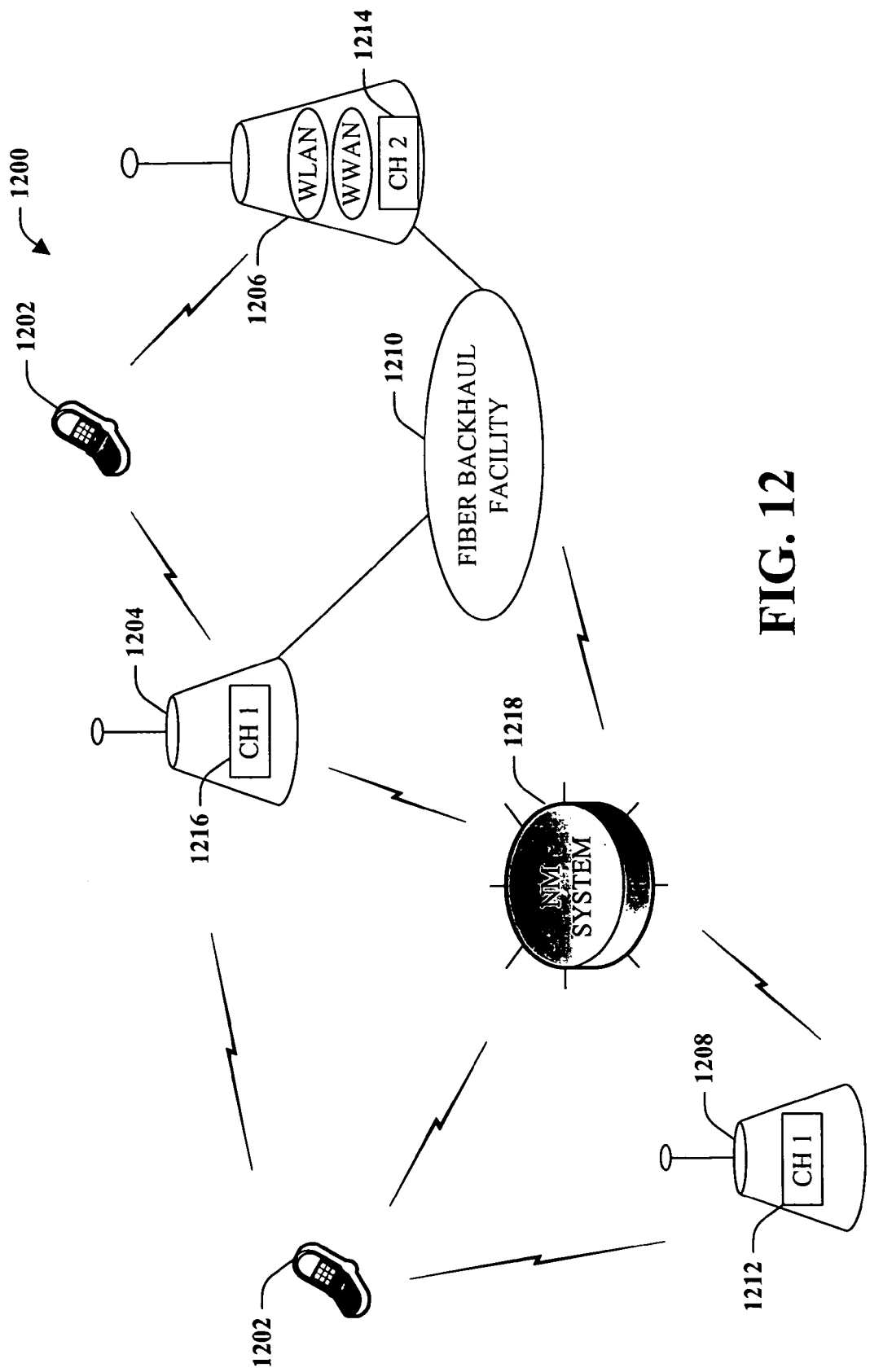
FIG. 12 illustrates an exemplary self-configuring ad-hoc network that can be constructed utilizing WLAN and WWAN technologies.

FIG. 12 illustrates an exemplary self-configuring ad-hoc network 1200 that can be constructed utilizing WLAN and/or WWAN technologies. For example, a metropolitan area can be served by a cluster of WLAN nodes for applications that should have high bandwidth but do not require high mobility. Generally, backhauling traffic from every LAN node on a fiber link to the WAN is an expensive proposition, therefore, a self-configuring ad-hoc network can provide a less expensive alternative.

As illustrated, mobile devices 1202 can communicate wirelessly with a cluster of WLAN nodes 1204, 1206, 1208. A few nodes 1204, 1206 might be connected to a fiber backhaul facility 1210 while other node(s) 1208 are not connected to the fiber backhaul facility 1210. It should be appreciated that while one facility 1210 is shown, the network can include more than one facility. The WLAN nodes 1204, 1206, 1208 can be utilized to relay traffic from a mobile device 1202 and/or a source node, such as node 1208 to a node connected by fiber transmission facilities, such as nodes 1204 and 1206.

One or more nodes can be a hot spot nodes configured to operate on multiple WLAN channels simultaneously, such as node 1208. One of the channels 1212 can be utilized for picking up traffic from the stations associated with the node. Another one (or more) channels 1214 can be utilized to perform the relay function. Alternatively, a single channel 1216 can be associated with a hot spot node 1204 and the single channel 1216 can be utilized to pick up traffic and perform the relay functionality.

Configuring the network topology, allocating channels to different nodes and/or making routing decisions should be provided through control, coordination, and communication between the WLAN nodes 1204, 1206, 1208. To achieve this functionality, one or more WLAN nodes can have a WWAN function built into it, illustrated at node 1206. Dual functionality makes available an out of band channel that can be utilized for control purposes.

A Network Management (NM) system 1218 can be associated with an ad-hoc network 1200 to create an initial topography. The NM system can also decide which channels to use 1212, 1214, 1216. Another function of the NM system can be a determination of routing among the nodes 1204, 1206, 1208.

By way of example and not limitation, a handset can be provided or obtain information, through the WAN, for example, that a first access point is at its peak or using the majority of its resources at a certain time and at which frequency. A different access point, in close proximity to the first access point may reach its peak at a different time and/or on a different frequency. With this information, the handset does not have to continuously tune to the channel or frequency utilized by the second access point because it can already be supplied with information about both the first and second access point. In such a manner, the handset knows when to tune and listen for the beacon of either access point. It can also determine whether it can move to the different access point and/or frequency utilizing both location and timing information.

Figure 13:
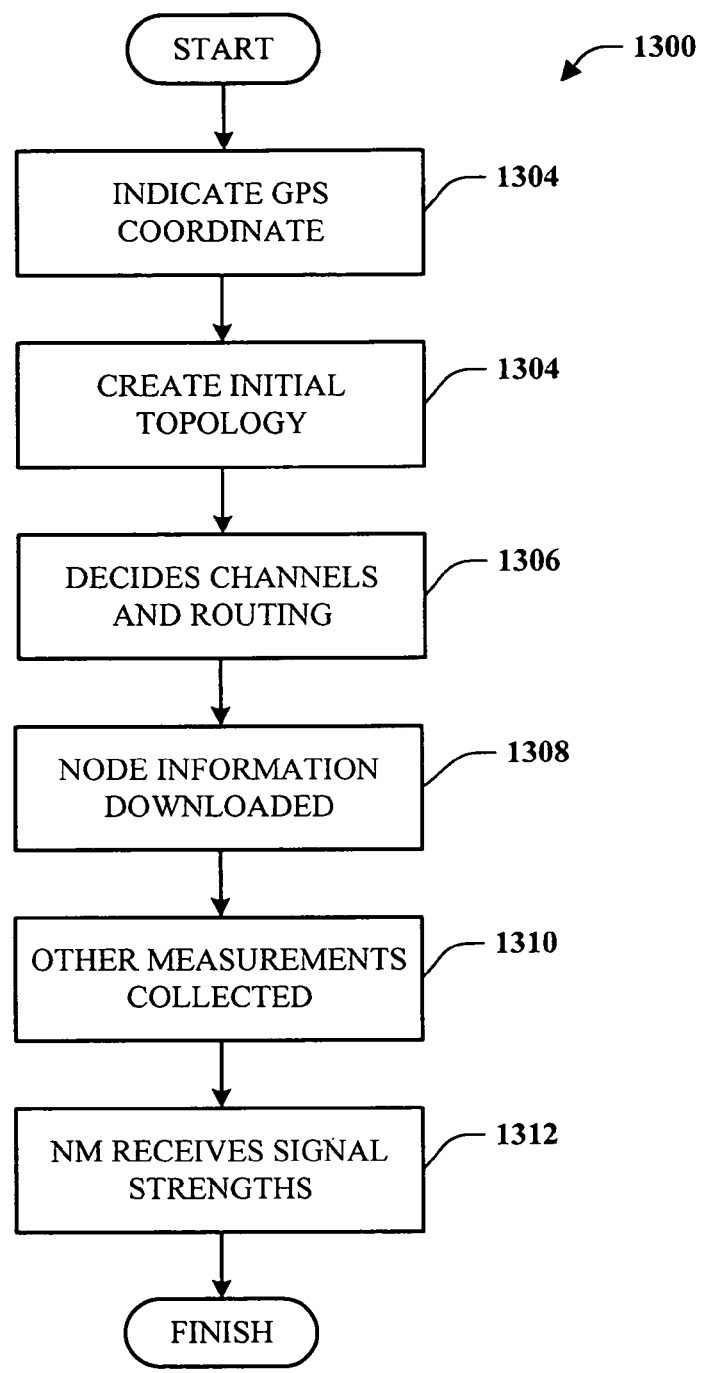
FIG. 13 illustrates a methodology for utilizing WLAN and WWAN technologies to construct a self-configuring ad-hoc network.

Referring now to FIG. 13 illustrated is a methodology 1300 for utilizing WLAN and/or WWAN technologies to construct a self-configuring ad-hoc network similar to that shown and described with reference to FIG. 12. The method begins at 1302 where each node utilizes a WWAN channel to indicate its GPS coordinates, which can be communicated to an NM system. The NM system, having knowledge of the location of each node can create an initial topology, at 1304. The topology is designed to achieve a rich connectivity between the nodes and diverse routes from the nodes to the node connected to the WAN by fiber. The NM system can also decide the channels to be used as well as routing, at 1306. The information pertinent to each node can be downloaded on the WWAN, at 1308. Once the wireless hot spots are activated, further measurements can be collected at 1310. The received signal strengths can be sent to the NM system, at 1312, which can utilize the initial topology and routing to take into account the actual field conditions. In addition, the access point can utilize timing information generated by the WWAN to synchronize itself.

The methodology and system described above is a centralized approach and can be used for a large network of hot spots with strong QoS needs. Capacity of the network can be maximized while minimizing interference.

Figure 14:
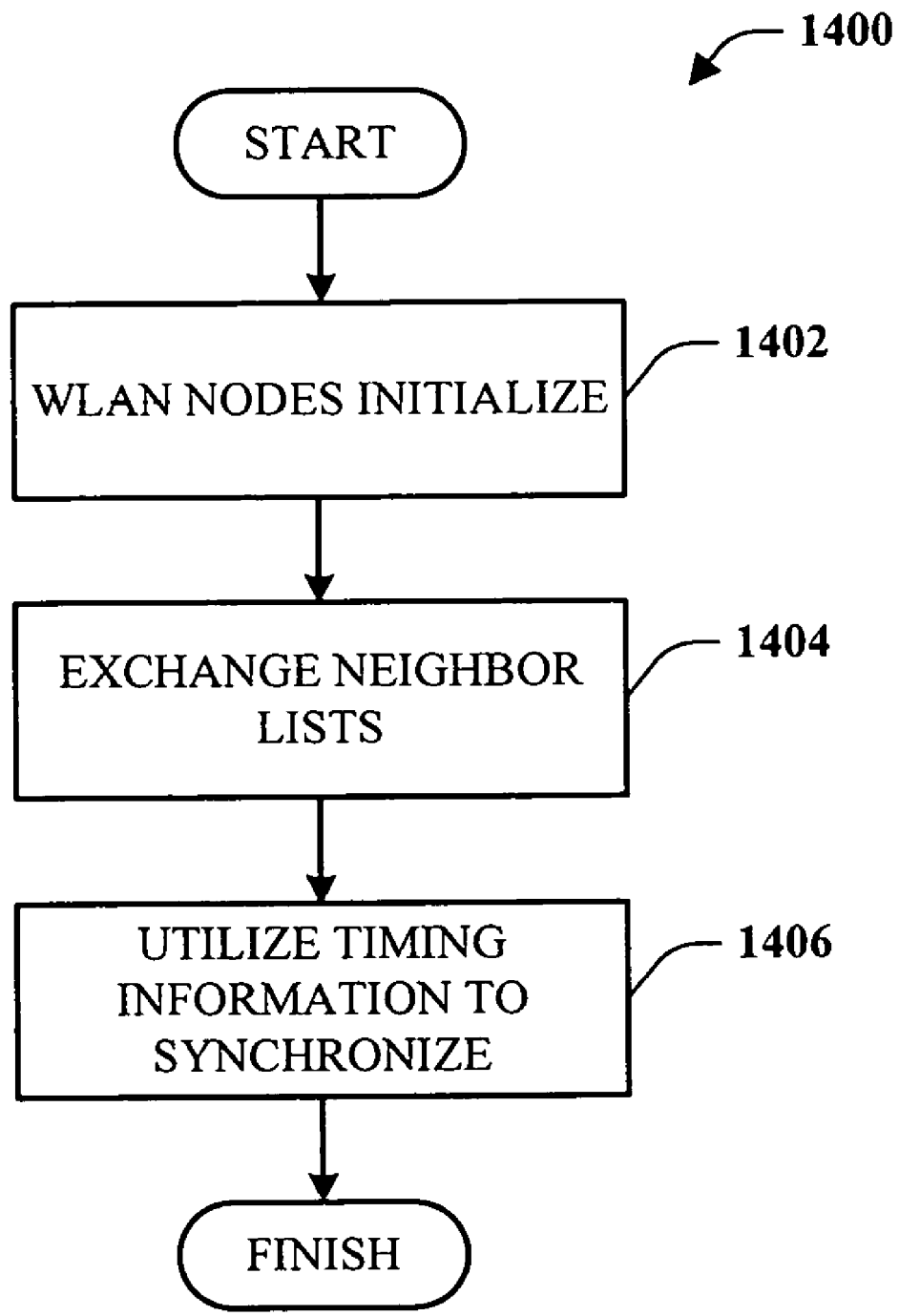
FIG. 14 illustrates a methodology for initializing neighbor lists on the WWAN control channel to facilitate synchronization of access terminals.

FIG. 14 illustrates another embodiment of a methodology 1400 for initializing neighbor lists on the WWAN control channel to facilitate synchronization of access terminals. The methodology can be utilized in a self-configuring Wireless Mesh network. The methodology beings, at 1402, when the WLAN nodes initialize. At a substantially similar time as the nodes initialize, they exchange neighbor lists on the WWAN control channel, at 1404. These neighbor lists can include information about access points in the surrounding area and/or mobile devices that are utilizing those access points. For example, the neighbor lists can include a timing signal transmitted by the mobile device in response to a communication over a WWAN. A protocol, such as Open Shortest Path First (OSPF) can be utilized to exchange neighbor lists and create shortest paths in a distributed manner. The exchange of timing lists, at 1404, can include a second timing signal transmitted through a WLAN and based upon the timing signal sent in response to the communication over the WWAN. The mobile device or access terminal can utilize the timing information generated by the WWAN to self-synchronize, at 1406, for communication through the WLAN with one or more other access terminals based on the second timing signal. This can be done directly through the closest WWAN or WLAN access point whose vicinity is known (e.g., from the neighbor list or directly through its own WWAN function). Alternatively, it may receive this information from an access terminal with combined WWAN and WLAN functionality. For example, transmission of the timing signal can include sending a timing signal from a first access terminal to one or more other terminals that synchronizes with the first access terminal.

Figure 15:
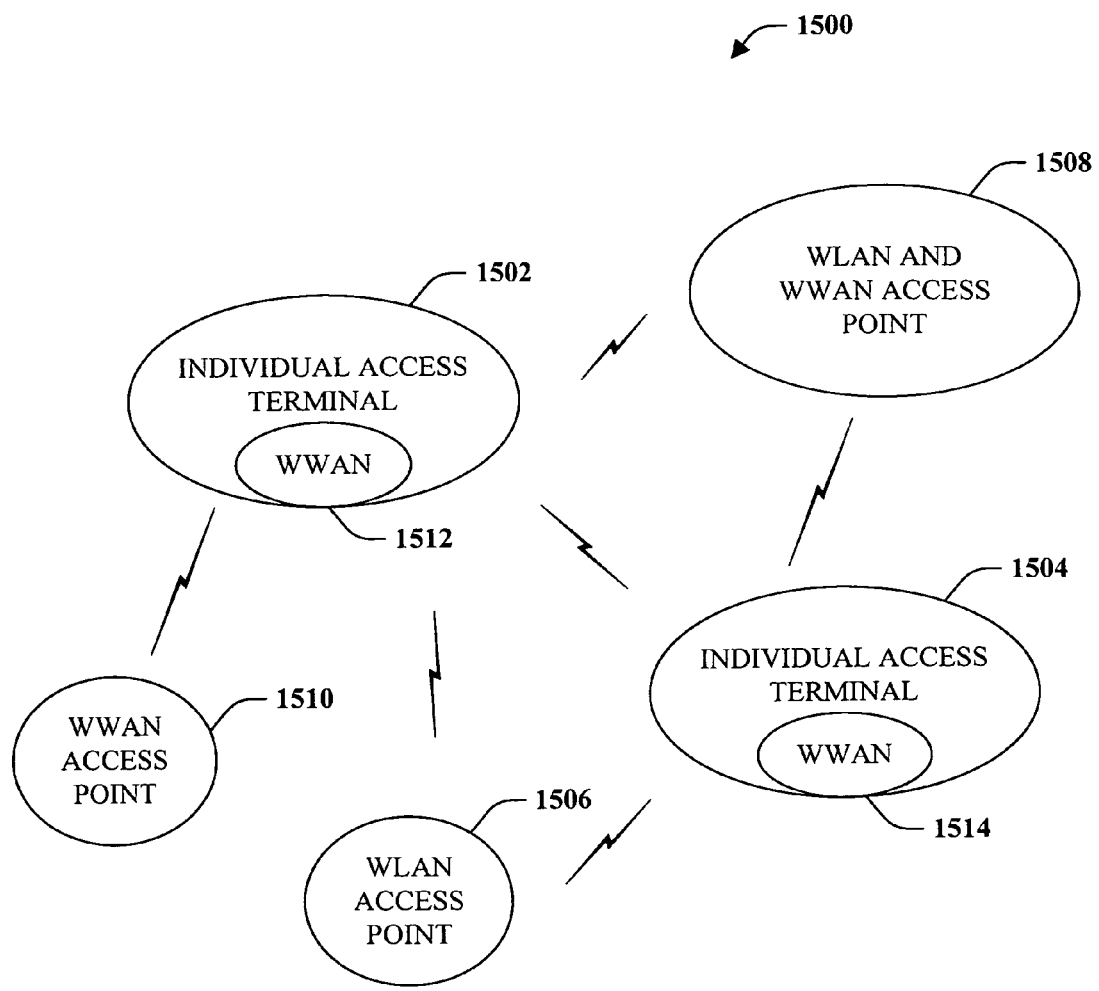
FIG. 15 illustrates peer-to-peer communication in a WLAN network.

FIG. 15 illustrates peer-to-peer communication 1500 in a WLAN network. In certain scenarios, individual access terminals 1502 and 1504 can communicate with each other using one or more WLAN access points 1506, 1508. To improve this communication, timing information from WWAN access points 1508, 1510 can be utilized to synchronize the access terminal clocks. It will be appreciated that some access points can include only WLAN functionality 1506 or WWAN functionality 1510 or a combination of both WLAN and WWAN functionality 1508.

The timing information can be provided through the WLAN access point, if the device has WWAN functionality 1512, 1514 or knowledge of a WWAN access point. Alternatively, the WWAN functionality on either or both access terminals can be utilized to provide this information to the access terminals that can then use the information to communicate over the WLAN.

Figure 16:
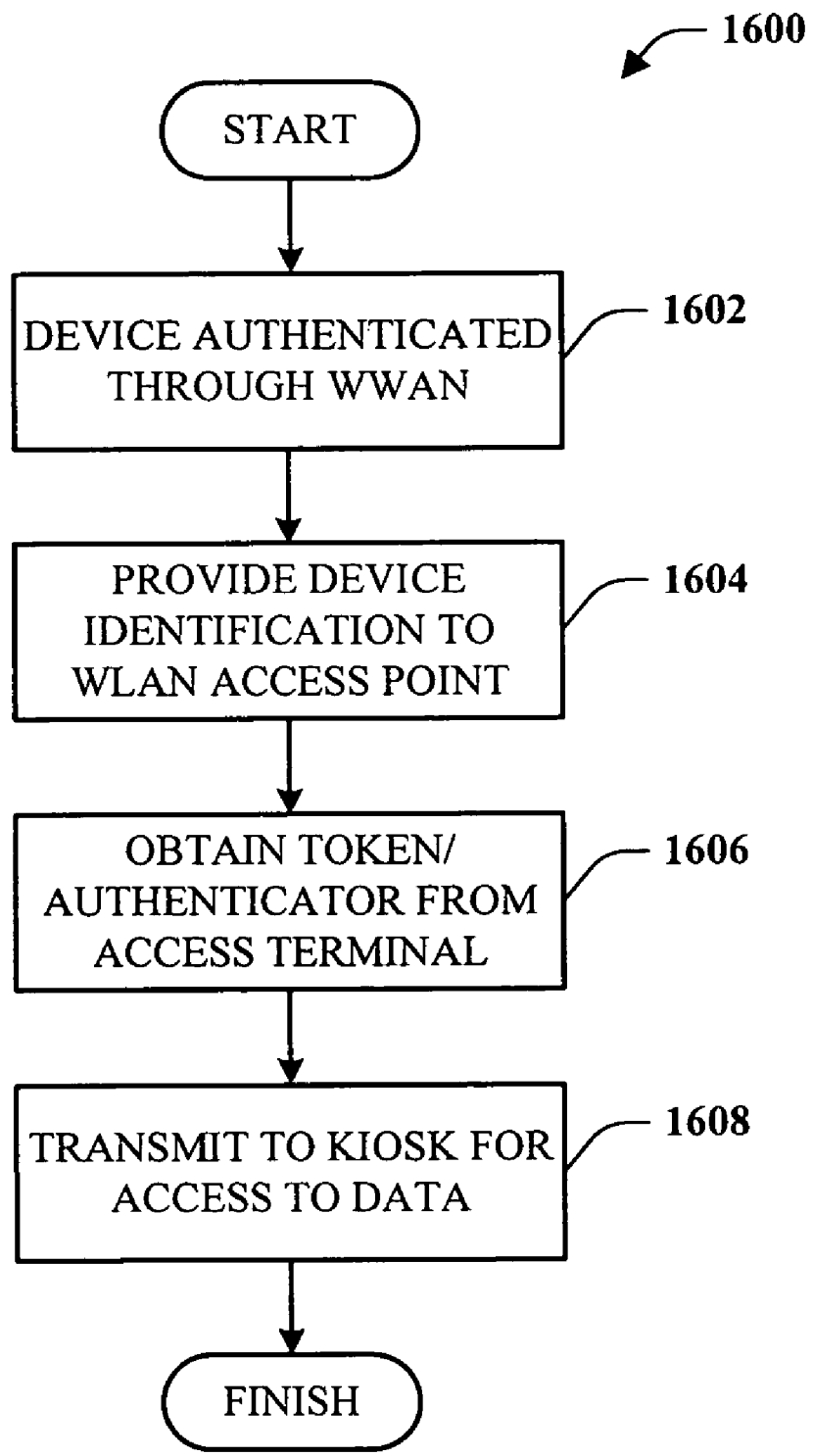
FIG. 16 illustrates a methodology for registration and/or authentication in an Independent Basic Service Set (IBSS) network.

FIG. 16 illustrates a methodology 1600 for registration and/or authentication in an Independent Basic Service Set (IBSS) network. An IBSS network is an IEEE 802.11-based wireless network that has no backbone infrastructure. The IBSS network consists of at least two wireless stations. An IBSS network can be referred to as an ad-hoc network because it can be constructed quickly with little or no planning. The WWAN functionality residing at either the access terminal or WLAN access point can be utilized for registration and/or authentication of the access terminal for communication or access to services through the WLAN access point.

The method begins, at 1602, where a WWAN functionality at an access terminal can indicate a device identification or registration message (e.g., device identification residing on a subscriber identity module). The first registration message can include an encryption key. The device identification or registration message can be authenticated through the WWAN from a first access terminal. A second registration message or device identification can be transmitted and provided to a WLAN access point or other services, at 1604. The second registration message can be based on the first registration message. The message to the WLAN can be transmitted through either a backhaul or through an over the air token or air interface obtained through the WWAN for the access terminal. This also allows utilizing device specific encryption keys that can be authenticated through a WWAN system or WLAN system.

The registration/authentication approach is beneficial in a situation where a user of an access terminal is in wireless communication with a kiosk having WLAN functionality but lacking a broadband or complete backhaul connection to a network, e.g., Internet. In this situation, the authentication or billing information for sales scenarios (e.g., music, video, or other information) can be provided through the WWAN. For example, the user identification whether it is device or user specific (e.g., password or encryption key), can be exchanged throughout the WWAN. This enables the access terminal to obtain a token or other authenticator, at 1606. The token or other authenticator can be transmitted over the air to a kiosk, at 1608, allowing the access terminal to access a video, song, or other multimedia content. In such a manner, access through the WLAN is granted to the access terminal. It should be appreciated that after the second registration message is transmitted through the WWAN to the access terminal, a third registration message, based on the second registration message, can be sent from the access terminal to the WLAN access point. This third registration message can be sent through various media including an air interface.

This multimedia content can also be provided based upon the location of the mobile device. For example, in a mall, multimedia content can be provided from one or more retail store or other retail establishments based on the user location as well as a user-preference. The user-preference can be a preference previously communicated by the user and stored in a memory of the mobile device. A processor associated with the mobile device can analyze the information stored in the memory and determine if multimedia content should be accepted and communicated to the user or disregarded and not communicated to the user of the device. In another embodiment, the user-preference can be communicated to a service provider who maintains the information. For example, if the user is near a sporting goods store and previously specified that such user does not desire any information (e.g. current sales or price reductions, events, . . . ) relating to sports and/or sporting goods, the information broadcast by that particular store can be prevented from being transmitted to the user's mobile device. It should be understood that multimedia content is optional and the disclosed embodiments can be utilized without employing multimedia content.

According to another embodiment, ad-hoc WLAN networks can be coupled through WWAN. For example, if one or more IBSS networks are discovered they can be coupled through a backhaul provided by the WWAN. This might be available if one or more WLAN nodes/stations, in a given IBSS, have discovered or been discovered by an access point of the WWAN. This allows connection of WLAN stations, from different IBSSs, through a WWAN backhaul that may have a greater bandwidth or may have access to improved services. The different IBSSs can provide radio coverage in different areas, which can be non-continuous with respect to each other.

According to another embodiment is the ability for multicast and/or broadcast in an IBSS network. Broadcast and multi-cast messages can be provided through the WWAN backhaul. This can facilitate providing broadcast or multi-cast messages or data based upon location information. Further, this can provide the ability to transmit synchronized broadcast or multi-cast messages based upon timing information available through the WWAN (e.g., the timing signal from a neighboring WWAN access point can be utilized for timing purposes).

Figure 17:
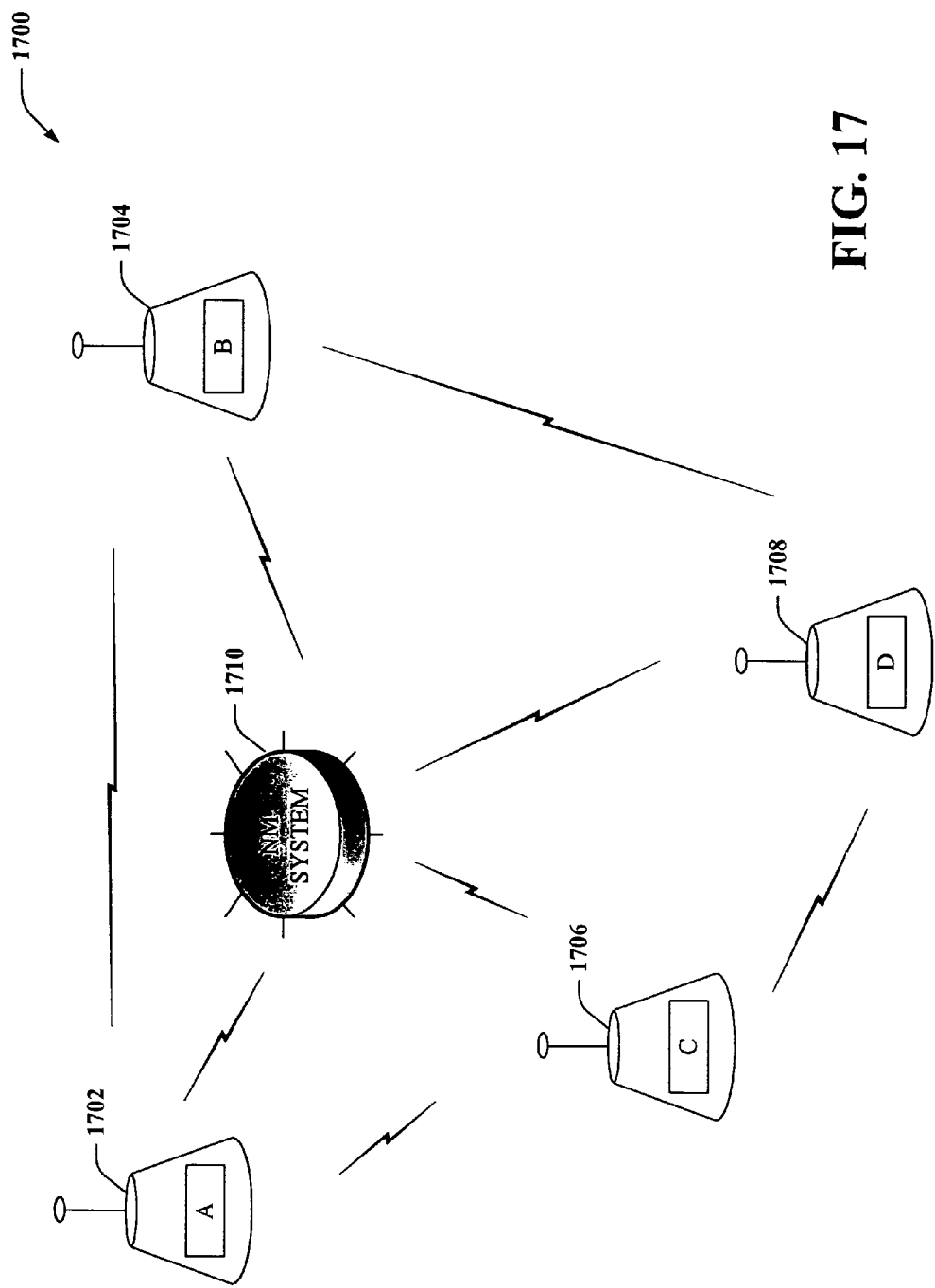
FIG. 17 illustrates an exemplary ad-hoc mesh network.

FIG. 17 illustrates an exemplary ad-hoc mesh network 1700. The network 1700 is illustrated as an ad-hoc network utilizing four access points or base stations "A" 1702, "B" 1704, "C" 1706, and "D" 1708. An ad-hoc mesh network 1700 can employ any number of access points and four access points is chosen for illustration purposes only. It should be understood that an ad-hoc mesh network 1700 can be a network in infrastructure mode utilizing access points (as shown), a peer-to-peer network that does not utilize access points, or a network that utilizes both infrastructure mode (access points) and peer-to-peer mode.

The topology of network 1700 illustrates that access point A 1702 is connected through wireless communication to access points B 1704, access point C 1706 and/or access point D 1708. A decision relating to efficient links should be established for the access points. This decision can be performed through a wide area control channel wherein each access point sends its GPS coordinate (or other location means) to a central network management (NM) system 1710. NM system 1710 having the location of all the access points 1702, 1704, 1706, 1708 in the network 1700 determines the network topology and the communication link between the access points 1702, 1704, 1706, 1708. For example, NM network 1710 might determine that in the topology access point A 1702 should communicate with access point B 1704, access point B 1704, should communicate with access point C 1706, and access point C 1706 should communicate with access point D 1708. NM system 1710 can also determine which channel each access point should use as a function of frequency management. For example, NM system 1710 can determine that access point A 1702 should use channel A or a 20 MHz channel and that access point B 1704 should use a different channel, such as a different 20 MHz channel, etc.

In an ad-hoc network, access points can be deleted or added at any time. However, the communication between the access points should remain constant to provide a smooth transmission of communication. When a major event occurs (disaster, etc.) the entire topology may need to change. Thus, a control channel should be configured to provide adequate connectivity without excessive interference. Each access point can be configured with WLAN functionality, which automatically configures each access point with a permissive channel, allowing anyone to communicate through that network management channel. This permissive channel mitigates problems associated with lack of availability of the control channel. The channel communicates its coordinates to the NM system 1710. This can be established through any level of bandwidth, and a narrow band WAN channel can be sufficient for this purpose. Once the location information is received, the ad-hoc network can be reconfigured or a new ad-hoc network established.

NM system 1710 can also provide the routing of specific packets. The NM system 1710 can access each access point 1702, 1704, 1706, 1708 and provide or download to each access point 1702, 1704, 1706, 1708 a routing table. The routing table can provide routing information for specific packets or specific types of packets. For example if a voice packet is to be routed, NM system 1710 (through the routing table) can instruct the access point that the voice packet is to be routed to access point B 1704, then to access point C 1706, then to access point D 1708, etc. until the voice packet reaches its final destination. If the packet is a data packet, the routing might be from access point D 1708 to access point B 1704 to access point A 1702. A video packet might take a different route. In such a manner, the NM system 1710 is determining both the topology or configuration of the ad-hoc network 1700 and how the packets are routed in real time. Thus, a WWAN network can provide powerful control and signaling capabilities to manage the ad-hoc network(s) 1700 and can provide data paths to make up for connectivity gaps in a WLAN network. It should be understood that the routing and/or topology discussed is for example purposes and is not meant to limit the disclosed embodiments.

NM system 1710 can take into account traffic sensitivity to determine packet routing. For example, links can be reestablished during certain times of the day, week, etc. NM system 1710 can monitor the traffic during potentially peak times (e.g. morning rush hour, evening rush hour, . . . ). During such times, there can be a certain flow of traffic and the routing or links can be set-up and/or changed on demand, with a high level of flexibility.

In a network that is operating in a peer-to-peer mode (no access points) or a combination of infrastructure mode and a peer-to-peer mode, the handsets are utilized to establish the network, or a portion of the network. In such a situation, a NM system might not be utilized since the configuration of the network can change quickly. In this situation, each handset broadcasts its information and the handsets that receive the information would rebroadcast the information to other handsets. This passing off or rebroadcast of the information would continue until the information reaches its destination. In such a peer-to-peer ad-hoc network, a first handset A might communicate to handset B utilizing WLAN. Handset B might communicate with handset C utilizing WWAN. The handsets can communicate utilizing mixed modes or sets, provided the handsets have WWAN, WWAN, WPAN, Wi-Fi, etc. functionality.

Figure 18:
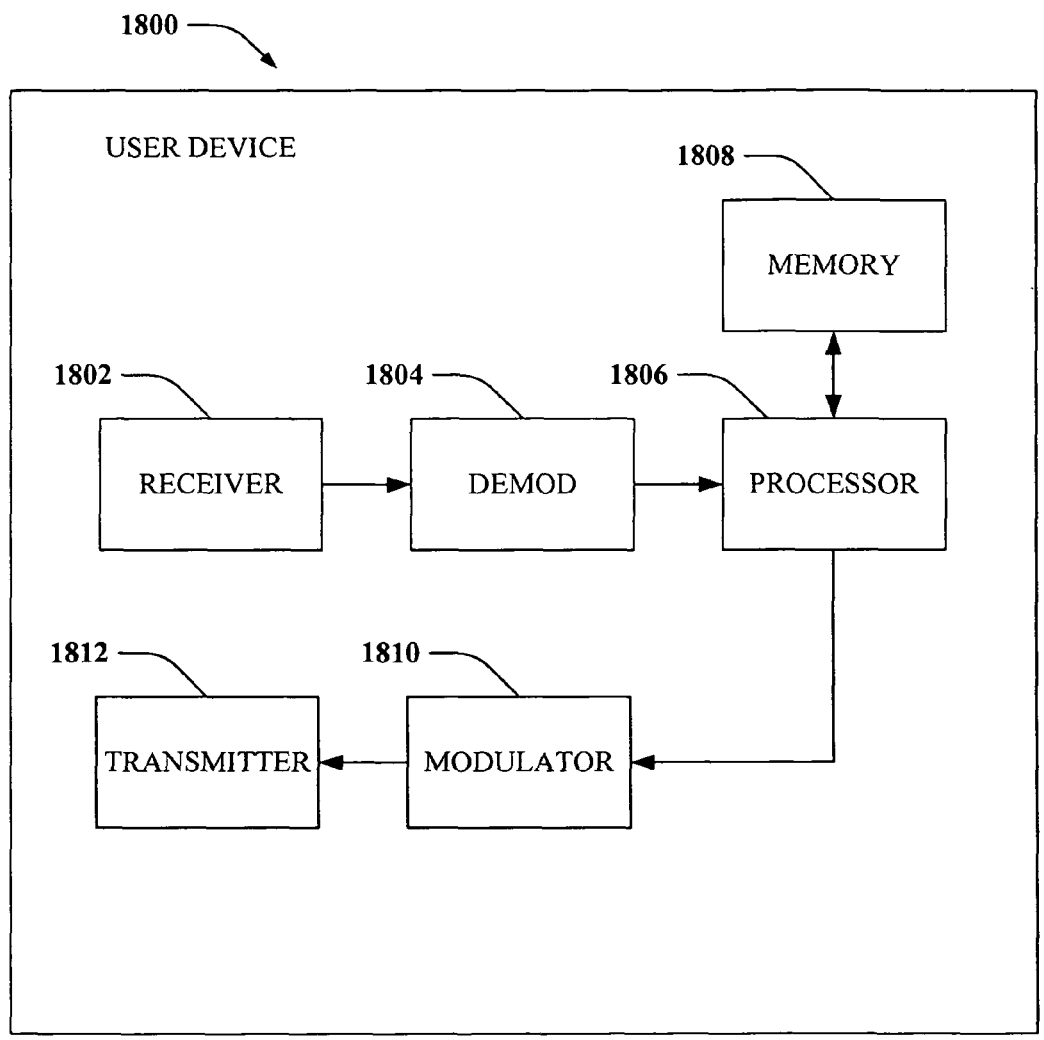
FIG. 18 illustrates a system that coordinates communication between multiple communication protocols in a wireless communication environment in accordance with one or more embodiments presented herein.

With reference now to FIG. 18, illustrated is a system 1800 that facilitates coordinated communication between multiple communication protocols in a wireless communication environment in accordance with one or more of the disclosed embodiments. System 1800 can reside in an access point and/or in a user device. System 1800 comprises a receiver 1802 that can receive a signal from, for example, a receiver antenna. The receiver 1802 can perform typical actions thereon, such as filtering, amplifying, downconverting, etc. the received signal. The receiver 1802 can also digitizes the conditioned signal to obtain samples. A demodulator 1804 can obtain received symbols for each symbol period, as well as provide received symbols to a processor 1806.

Processor 1806 can be a processor dedicated to analyzing information received by receiver component 1802 and/or generating information for transmission by a transmitter 1816. Processor 1806 control one or more components of user device 1800, and/or processor 1806 that analyzes information received by receiver 1802, generates information for transmission by transmitter 1816 and controls one or more components of user device 1800. Processor 1806 may include a controller component capable of coordinating communications with additional user devices.

User device 1800 can additionally comprise memory 1808 that is operatively coupled to processor 1806 and that stores information related to coordinating communications and any other suitable information. Memory 1808 can additionally store protocols associated with coordinating communication. It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1808 of the subject systems and/or methods is intended to comprise, without being limited to, these and any other suitable types of memory. User device 1800 still further comprises a symbol modulator 1810 and a transmitter 1812 that transmits the modulated signal.

Figure 19:
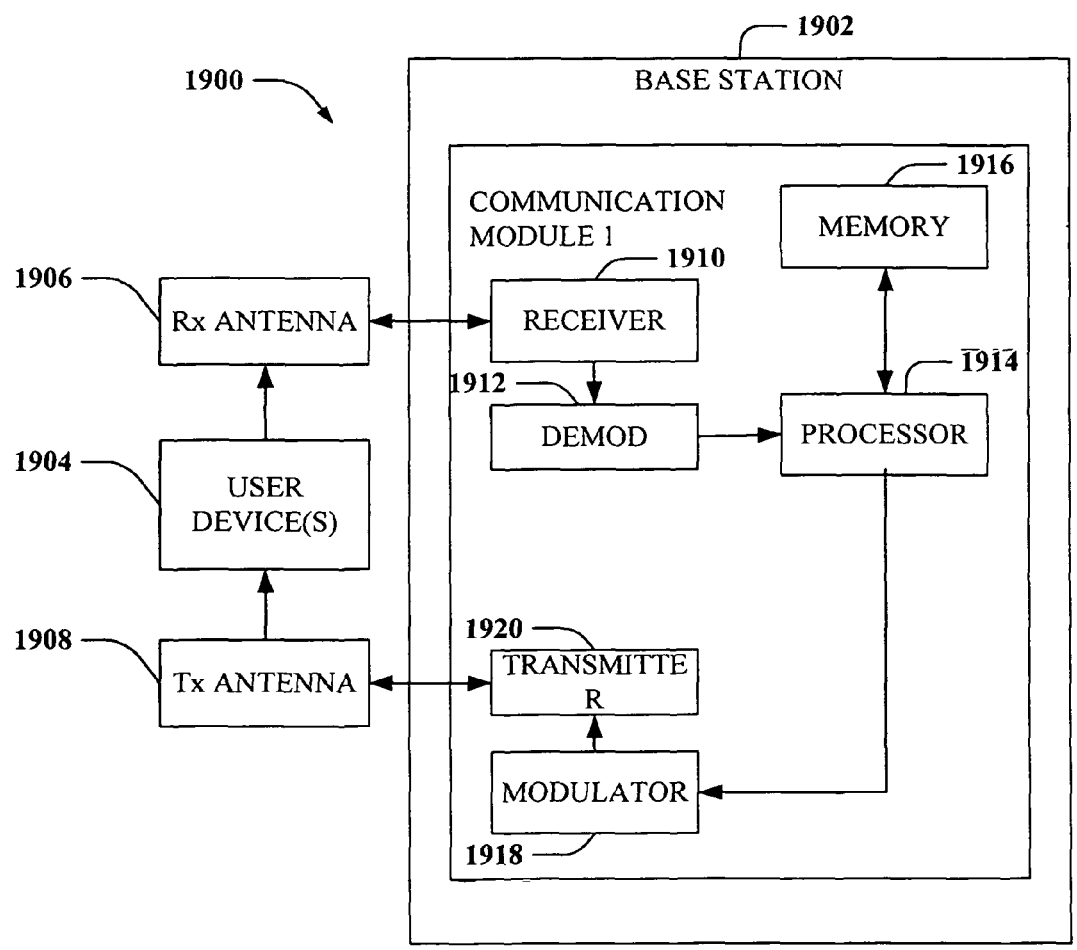
FIG. 19 illustrates a system that coordinates communication in wireless communication environment in accordance with various aspects.

FIG. 19 is an illustration of a system 1900 that facilitates coordination of communication protocols in accordance with various aspects. System 1900 comprises a base station or access point 1902. As illustrated, base station 1902 receives signal(s) from one or more user devices 1904 by a receive antenna 1906, and transmits to the one or more user devices 1904 through a transmit antenna 1908.

Base station 1902 comprises a receiver 1910 that receives information from receive antenna 1906 and is operatively associated with a demodulator 1912 that demodulates received information. Demodulated symbols are analyzed by a processor 1914 that is coupled to a memory 1916 that stores information related to code clusters, user device assignments, lookup tables related thereto, unique scrambling sequences, and the like. A modulator 1918 can multiplex the signal for transmission by a transmitter 1920 through transmit antenna 1908 to user devices 1904.

Figure 20:
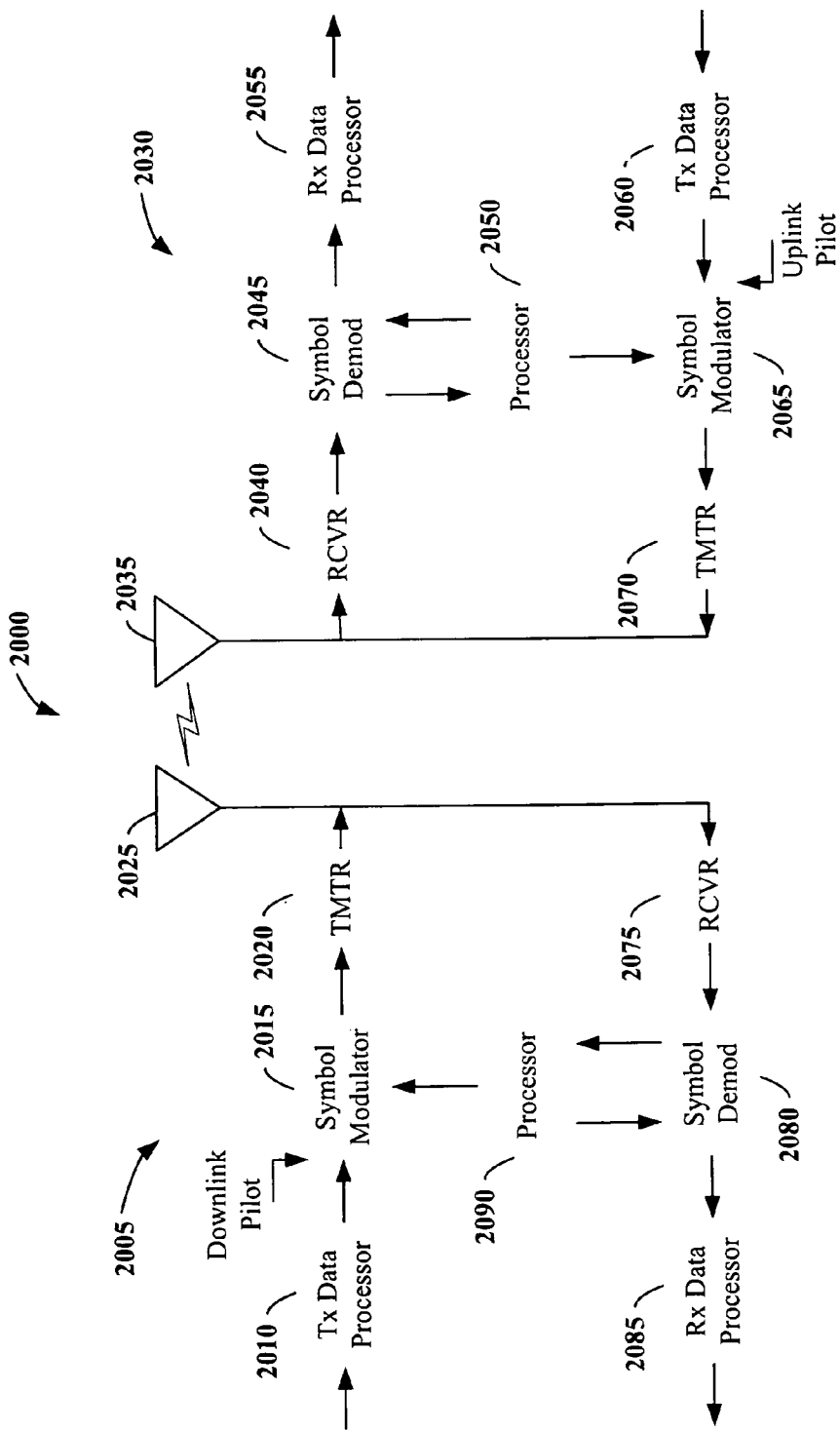
FIG. 20 illustrates a wireless communication environment that can be employed in conjunction with the various systems and methods described herein.

FIG. 20 illustrates an exemplary wireless communication system 2000. Wireless communication system 2000 depicts one base station and one terminal for sake of brevity. However, it is to be appreciated that system 2000 can include more than one base station or access point and/or more than one terminal or user device, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 20, on a downlink, at access point 1905, a transmit (TX) data processor 2010 receives, formats, codes, interleaves, and modulates (or symbol maps) traffic data and provides modulation symbols ("data symbols"). A symbol modulator 2015 receives and processes the data symbols and pilot symbols and provides a stream of symbols. A symbol modulator 2015 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 2020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 2025 to the terminals. At terminal 2030, an antenna 2035 receives the downlink signal and provides a received signal to a receiver unit (RCVR) 2040. Receiver unit 2040 conditions (e.g., filters, amplifies, and frequency downconverts) the received signal and digitizes the conditioned signal to obtain samples. A symbol demodulator 2045 obtains N received symbols and provides received pilot symbols to a processor 2050 for channel estimation. Symbol demodulator 2045 further receives a frequency response estimate for the downlink from processor 2050, performs data demodulation on the received data symbols to obtain data symbol estimates (which are estimates of the transmitted data symbols), and provides the data symbol estimates to an RX data processor 2055, which demodulates (e.g., symbol demaps), deinterleaves, and decodes the data symbol estimates to recover the transmitted traffic data. The processing by symbol demodulator 2045 and RX data processor 2055 is complementary to the processing by symbol modulator 2015 and TX data processor 1910, respectively, at access point 2005.

On the uplink, a TX data processor 2060 processes traffic data and provides data symbols. A symbol modulator 2065 receives and multiplexes the data symbols with pilot symbols, performs modulation, and provides a stream of symbols. A transmitter unit 2070 then receives and processes the stream of symbols to generate an uplink signal, which is transmitted by the antenna 2035 to the access point 2005.

At access point 2005, the uplink signal from terminal 2030 is received by the antenna 2025 and processed by a receiver unit 2075 to obtain samples. A symbol demodulator 2080 then processes the samples and provides received pilot symbols and data symbol estimates for the uplink. An RX data processor 2085 processes the data symbol estimates to recover the traffic data transmitted by terminal 2030. A processor 2090 performs channel estimation for each active terminal transmitting on the uplink.

Processors 2090 and 2050 direct (e.g., control, coordinate, manage, etc.) operation at access point 2005 and terminal 2030, respectively. Respective processors 2090 and 2050 can be associated with memory units (not shown) that store program codes and data. Processors 2090 and 2050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 2090 and 2050.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for utilizing time-based information to improve communication in a wireless network, comprising:

receiving, at a first mobile device and from a first access point, beacon information corresponding to a second access point;

wherein the beacon information was previously received at the first access point from a second mobile device;

wherein the beacon information includes a timing of a beacon of the second access point based on a receipt of the beacon by the second mobile device;

wherein the timing of the beacon of the second access point comprises time-stamp information representing a time on the second mobile device corresponding to an arrival of the beacon at the second mobile device; and utilizing the time-stamp information associated with the beacon information to determine whether to hand off a communication of the first mobile device to the second access point.

2. The method of claim 1, further comprising:

detecting a quality associated with a channel of the communication is below a threshold level;

transmitting a poor quality message; and wherein the receiving further comprises receiving information relating to a plurality of alternate access points in response to the transmitted poor quality message.

3. The method of claim 2, further comprising:

choosing between the plurality of alternate access points depending at least in part on an application of the first mobile device.

4. The method of claim 2, further comprising:

selecting one of the plurality of alternate access points having a beacon quality level above a predetermined threshold, wherein the plurality of access points comprise at least one of a Wireless Wide-Area Network (WWAN), Wireless Local-Area Network (WLAN) or Wireless Personal-Area Network (WPAN).

5. The method of claim 2, further comprising:

determining through a WWAN or WLAN functionality to switch between a WWAN and a WLAN to achieve a superior bandwidth or signal strength.

6. The method of claim 2, wherein the information relating to the plurality of alternate access points include respective channels or beacon transmission times.

7. The method of claim 1, wherein the time-stamp information is defined by a GPS technology or is defined relative to a WWAN timing.

8. A method for performing a handoff in a wireless network, comprising:

transmitting, by a first mobile device, location information defining a location of the first mobile device;

obtaining, from a WWAN access point, beacon timing information for a beacon of a WLAN access point in a proximity of the first mobile device based on the location information;

wherein the beacon timing information was previously received at the WWAN access point from a second mobile device;

wherein the beacon timing information includes a timing of the beacon of the WLAN access point based on a receipt of the beacon by the second mobile device;

wherein the beacon timing information of the beacon of the WLAN access point represents a time on the second mobile device corresponding to an arrival of the beacon at the second mobile device; and ascertaining whether to transfer the first mobile device between the WWAN and the WLAN based at least in part on the beacon timing information.

9. The method of claim 8, wherein ascertaining whether to transfer between the WWAN and the WLAN further comprises:

determining if bandwidth of the WWAN or the WLAN is sufficient to accommodate an application of the first mobile device.

10. The method of claim 8, further comprising:

switching from the WWAN to the WLAN if bandwidth or signal strength is superior on the WLAN than on the WWAN.

11. The method of claim 8, further comprising:

switching from the WLAN to the WWAN if bandwidth or signal strength is superior on the WWAN than on the WLAN.

12. The method of claim 8, wherein the beacon timing information is defined by a GPS technology or is defined relative to a WWAN timing.

13. A mobile device, comprising:

a WLAN component configured to communicate with one or more WLANs;

a WWAN component configured to receive from a WWAN one or more beacon timings of one or more beacons associated with one or more WLANs;

wherein each WLAN beacon timing was previously received at the WWAN from at least one second mobile device;

wherein each WLAN beacon timing includes a timing of each beacon of each WLAN based on a receipt of the respective beacon by the respective second mobile device;

wherein each WLAN beacon timing represents a time on the respective second mobile device corresponding to an arrival of the corresponding beacon at the respective second mobile device;

a memory that stores a requirement relating to a device application; and a processor that analyzes information stored in the memory and determines if at least one WLAN satisfies the device application requirement based in part on the corresponding WLAN beacon timing and recommends a handoff to the at least one WLAN.

14. The mobile device of claim 13, further comprising a coupling to a computer to utilize the WWAN component or WLAN component through the computer.

15. The mobile device of claim 13, wherein at least one beacon timing associated with the one or more WLANs is utilized by the processor to determinate a handoff management schedule.

16. The mobile device of claim 15, wherein the handoff management schedule is based at least in part on channel quality information.

17. The mobile device of claim 15, wherein the handoff management schedule is based in part on tuning to each of the one or more WLANs at corresponding beacon timings and measuring received channel quality information received from each of the one or more WLANs.

18. An apparatus for enhancing network communication through time-based information, comprising:

means for receiving, at the apparatus and from a WWAN access point, beacon information corresponding to one or more WLAN access points;

wherein the beacon information was previously received at the WWAN access point from at least one second apparatus;

wherein the beacon information includes a timing of each beacon of each of the one or more WLAN access points based on a receipt of each beacon by the at least one second apparatus;

wherein the timing of each beacon of each of the one or more WLAN access points comprises a time stamp representing a time on the at least one second apparatus corresponding to an arrival of the respective beacon at the at least one second apparatus; and means for deciding whether to handoff the apparatus from the WWAN access point to a WLAN access point based at least in part on the time stamp associated with the beacon of the WLAN access point.

19. The apparatus of claim 18, further comprising:
means for managing a handoff schedule to accommodate an application of the apparatus.

20. A non-transitory computer-readable medium having stored thereon computer-executable instructions for:
receiving, at a mobile device, a beacon Comprising beacon information from one or more access points, wherein the beacon information includes location information corresponding to each of the one or more access points;
associating a time-stamp with the beacon information, based on an arrival time at the mobile device of the beacon, utilizing a timing of a Global Positioning System (GPS) functionality;
transmitting the time-stamp and the beacon information to a network management system through a WWAN functionality;
receiving a listing of local access points and corresponding beacon arrival times relative to the timing of the GPS functionality based on the location information corresponding to the beacon information;
wherein one or more of the beacon arrival times were previously received at the network management system from one or more second mobile devices;
wherein the one or more beacon arrival times correspond to a beacon of one or more of the local access points based on a receipt of the beacon by the one or more second mobile devices;
wherein the one or more beacon arrival times comprise time-stamp information representing a time on the one or more second mobile devices corresponding to an arrival of the beacon at the respective second mobile device; and
determining, based on the listing, a handoff management schedule between a WWAN, WLAN or WPAN.

21. The computer-readable medium of claim 20, further comprising instructions for:
sending a message when a beacon quality has fallen below a threshold level;
wherein receiving the listing of local access points is in response to the sending of the message; and
switching between a WWAN, WLAN or WPAN to achieve a beacon quality at or above the threshold level.

22. The computer-readable medium of claim 20, further comprising instructions for:
determining through a WWAN or WLAN functionality to switch between a WWAN network and a WLAN network to achieve a superior bandwidth or signal strength.

23. A processor that executes instructions for seamless switching of a mobile device between WWAN and WLAN, comprising:
receiving, at the mobile device and froth a WWAN access point, timing information of at least one WLAN beacon corresponding to at least one WLAN access point;
wherein the timing information was previously received at the WWAN access point from a second mobile device;
wherein the timing information is based on a receipt of the at least one WLAN beacon by the second mobile device;
wherein the timing information is defined by a time-stamp representing a time on the second mobile device corresponding to an arrival time of the at least one WLAN beacon at the second mobile device;
detecting a WLAN beacon at a receipt time according to the received timing information;
detecting a beacon quality level;
transmitting the beacon quality level with the associated receipt time to a network management system; and
switching the mobile device between the WWAN access point and a WLAN access point based on information received from the management system in response to the transmitted beacon quality level and associated beacon receipt time.

24. A method for managing communications in a wireless network, comprising:
detecting at a mobile device presence of a WWAN and a plurality of WLANs;
receiving a beacon from at least one WLAN access point;
determining beacon timing information corresponding to the beacon, the beacon timing information representing a time on the mobile device corresponding to an arrival of the beacon at the mobile device; and
transmitting the beacon timing information to a WWAN access point, wherein the WWAN access point is capable of receiving and storing the beacon timing information, and wherein the WWAN access point is capable of distributing the beacon timing information to other mobile devices for ascertaining whether to transfer between the WWAN and one of the plurality of WLANs based at least in part on the associated WLAN beacon timing.

25. The method of claim 24, wherein determining the beacon timing information comprises determining using a GPS component on the mobile device.

26. A mobile device, comprising:
a WLAN component operable to receive a beacon from a WLAN;
a time-stamp indicating a beacon timing of the WLAN beacon, wherein the time-stamp represents a time on the mobile device corresponding to an arrival of the WLAN beacon at the mobile device;
a processor operable to identify a network management device associated with the WWAN and to provide to the identified network management device with the WLAN beacon timing, wherein the network management device is capable of receiving and storing the WLAN beacon timing, and wherein the network management device is capable of distributing the beacon timing to other mobile devices for ascertaining whether to handoff between the WWAN and WLAN using the provided beacon timing.

27. The device of claim 26, further comprising a GPS component operable to receive a GPS signal indicating the beacon timing of the WLAN beacon.

28. An apparatus for enhancing network communication through time-based information, comprising:
means for detecting at a mobile device presence of a WWAN and a plurality of WLANs;
means for receiving a beacon from at least one WLAN access point;
means for determining a beacon timing information corresponding to the beacon, wherein the beacon timing information represents a time on the mobile device corresponding to an arrival of the beacon at the mobile device; and
means for transmitting the beacon timing information to a WWAN access point, wherein the WWAN access point is capable of receiving and storing the beacon timing information, and wherein the WWAN access point is capable of distributing the beacon timing information to other mobile devices for ascertaining whether to transfer between the WWAN and one of the plurality of WLANs based at least in part on the associated WLAN beacon timing.

29. The apparatus of claim 28, further comprising means for determining the beacon timing information using a GPS component.

30. The apparatus of claim 28, further comprising means for determining the beacon timing information relative to a network timing using a WWAN component.

31. The method, of claim 24, further comprising determining the beacon timing information using a WWAN component operable to receive a network signal indicating the beacon timing of the WLAN beacon relative to a network timing.

32. The device of claim 26, further comprising a WWAN component operable to receive a network signal indicating the beacon timing of the WLAN beacon relative to a network timing.

33. A method of performing a handoff, comprising:
receiving a beacon at a mobile device, the beacon comprising beacon information from one or more access points, wherein the beacon information includes location information corresponding to each of the one or more access points;
associating a time-stamp with the beacon information, based on an arrival time at the mobile device of the beacon, utilizing a timing of a Global Positioning System (GPS) functionality;
transmitting the time-stamp and the beacon information to a network management system through a WWAN functionality;
receiving a listing of local access points and corresponding beacon arrival times relative to the timing of the GPS functionality based on the location information corresponding to the beacon information;
wherein one or more of the beacon arrival times were previously received at the network management system from one or more second mobile devices;
wherein the one or more beacon arrival times correspond to a beacon of one or more of the local access points based on a receipt of the beacon by the one or more second mobile devices;
wherein the one or more beacon arrival times comprise time-stamp information representing a time on the one or more second mobile devices corresponding to an arrival of the beacon at the respective second mobile device; and
determining, based on the listing, a handoff management schedule between a WWAN, WLAN or WPAN.

34. The method of claim 33, further comprising:
sending a message when a beacon quality has fallen below a threshold level;
wherein receiving the listing of local access points is in response to the sending of the message; and
switching between a WWAN, WLAN or WPAN to achieve a beacon quality at or above the threshold level.

35. The method of claim 33, further comprising:
determining through a WWAN or WLAN functionality to switch between a WWAN network and a WLAN network to achieve a superior bandwidth or signal strength.

36. The method of claim 33, further comprising:
obtaining a requirement relating to a device application; and
determining if at least one of the access points in the listing satisfies the device application requirement based in part on the corresponding beacon arrival times and recommending a handoff to the at least one access point.

37. A mobile device, comprising:
a receiver configured to receive a beacon comprising beacon information from one or more access points, wherein the beacon information includes location information corresponding to each of the one or more access points;
a Global Positioning System (GPS) functionality having a timing;
a processor configured to associate a time-stamp with the beacon information, wherein the time-stamp indicates an arrival time at the mobile device of the beacon utilizing the timing of the GPS functionality;
a WWAN functionality configured to transmit the time-stamp and the beacon information to a network management system and to receive a listing of local access points and corresponding beacon arrival times relative to the timing of the GPS functionality based on the location information corresponding to the beacon information;
wherein one or more of the beacon arrival times were previously received at the network management system from one or more second mobile devices;
wherein the one or more beacon arrival times correspond to a beacon of one or more of the local access points based on a receipt of the beacon by the one or more second mobile devices;
wherein the one or more beacon arrival times comprise time-stamp information representing a time on the one or more second mobile devices corresponding to an arrival of the beacon at the respective second mobile device; and
wherein the processor is further configured to determine, based on the listing, a handoff management schedule between a WWAN, WLAN or WPAN.

38. The mobile device of claim 37, further comprising:
wherein the WWAN functionality is further configured to send a message when a beacon quality has fallen below a threshold level;
wherein the WWAN functionality is further configured to receive the listing of local access points is in response to the sending of the message; and
wherein the processor is further configured to switch between a WWAN, WLAN or WPAN to achieve a beacon quality at or above the threshold level.

39. The mobile device of claim 37, further comprising a WLAN functionality, and wherein the WWAN functionality or the WLAN functionality are configured to assist the processor in determining to switch between a WWAN network and a WLAN network to achieve a superior bandwidth or signal strength.

40. The mobile device of claim 37, further comprising:
a device application having a requirement relating to a communication; and
wherein the processor is further configured to determine if at least one of the access points in the listing satisfies the device application requirement based in part on the corresponding beacon arrival times and to recommend a handoff to the at least one access point.

41. The apparatus of claim 18, wherein the time stamp associated with the beacon of the WLAN access point is defined by a GPS technology of the mobile device or is defined relative to a WWAN timing.

42. A computer program product for utilizing time-based information to improve communication in a wireless network, comprising:
a non-transitory computer readable medium, comprising:
at least one instruction executable by a computer to receive, at a first mobile device and from a first access point, beacon information corresponding to a second access point;
wherein the beacon information was previously received at the first access point from a second mobile device;
wherein the beacon information includes a timing of a beacon of the second access point based on a receipt of the beacon by the second mobile device;
wherein the timing of the beacon of the second access point comprises time-stamp information representing a time on the second mobile device corresponding to an arrival of the beacon at the second mobile device; and
at least one instruction executable by the computer to utilize the time-stamp information associated with the beacon information to determine whether to hand off a communication of the first mobile device to the second access point.

43. At least one processor for utilizing time-based information to improve communication in a wireless network, comprising:
a first processing unit, including hardware, to receive beacon information corresponding to a second access point at a first mobile device from a first access point;
wherein the beacon information was previously received at the first access point from a second mobile device;
wherein the beacon information includes a timing of a beacon of the second access point based on a receipt of the beacon by the second mobile device;
wherein the timing of the beacon of the second access point comprises time-stamp information representing a time on the second mobile device corresponding to an arrival of the beacon at the second mobile device; and
a second processing unit to utilize the time-stamp information associated with the beacon information to determine whether to hand off a communication of the first mobile device to the second access point.

44. A mobile device for utilizing time-based information to improve communication in a wireless network, comprising:
a receiver to receive beacon information corresponding to a second access point at a first mobile device from a first access point;
wherein the beacon information was previously received at the first access point from a second mobile device;
wherein the beacon information includes a timing of a beacon of the second access point based on a receipt of the beacon by the second mobile device;
wherein the timing of the beacon of the second access point comprises time-stamp information representing a time on the second mobile device corresponding to an arrival of the beacon at the second mobile device; and
a processor to utilize the time-stamp information associated with the beacon information to determine whether to hand off a communication of the first mobile device to the second access point.

45. The mobile device of claim 44, further comprising:
wherein the processor is further capable of detecting a quality associated with a channel of the communication is below a threshold level;
a transmitter to transmit a poor quality message; and
wherein the receiver is further capable of receiving information relating to a plurality of alternate access points in response to the transmitted poor quality message.

46. The mobile device of claim 45, wherein the processor is further capable of choosing between the plurality of alternate access points depending at least in part on an application of the first mobile device.

47. The mobile device of claim 45, wherein the processor is further capable of selecting one of the plurality of alternate access points having a beacon quality level above a predetermined threshold, wherein the plurality of access points comprise at least one of a Wireless Wide-Area Network (WWAN), Wireless Local-Area Network (WLAN) or Wireless Personal-Area Network (WPAN).

48. The mobile device of claim 45, wherein the processor is further capable of determining through a WWAN or WLAN functionality to switch between a WWAN and a WLAN to achieve a superior bandwidth or signal strength.

49. A mobile device, comprising:
means for communicating with one or more WLANs;
means for receiving from a WWAN one or more beacon timings of one or more beacons associated with one or more WLANs;
wherein each WLAN beacon timing was previously received at the WWAN from at least one second mobile device;
wherein each WLAN beacon timing includes a timing of each beacon of each WLAN based on a receipt of the respective beacon by the respective second mobile device;
wherein each WLAN beacon timing represents a time on the respective second mobile device corresponding to an arrival of the corresponding beacon at the respective second mobile device;
means for storing a requirement relating to a device application; and
means for analyzing information stored in the memory and determining if at least one WLAN satisfies the device application requirement based in part on the corresponding WLAN beacon timing and recommends a handoff to the at least one WLAN.

50. A computer program product for utilizing time-based information to improve communication in a wireless network, comprising:
a non-transitory computer readable medium, comprising:
at least one instruction executable by a computer to communicate with one or more WLANs;
at least one instruction executable by the computer to receive from a WWAN one or more beacon timings of one or more beacons associated with one or more WLANs;
wherein each WLAN beacon timing was previously received at the WWAN from at least one second mobile device;
wherein each WLAN beacon timing includes a timing of each beacon of each WLAN based on a receipt of the respective beacon by the respective second mobile device;
wherein each WLAN beacon timing represents a time on the respective second mobile device corresponding to an arrival of the corresponding beacon at the respective second mobile device;
at least one instruction executable by the computer to store a requirement relating to a device application; and
at least one instruction executable by the computer to analyze information stored in the memory and determine if at least one WLAN satisfies the device application requirement based in part on the corresponding WLAN beacon timing and recommends a handoff to the at least one WLAN.

51. At least one processor for utilizing time-based information to improve communication in a wireless network, comprising:
a first processing unit, comprising hardware, to communicate with one or more WLANs;
a second processing unit to receive from a WWAN one or more beacon timings of one or more beacons associated with one or more WLANs;
wherein each WLAN beacon timing was previously received at the WWAN from at least one second mobile device;
wherein each WLAN beacon timing includes a timing of each beacon of each WLAN based on a receipt of the respective beacon by the respective second mobile device;
wherein each WLAN beacon timing represents a time on the respective second mobile device corresponding to an arrival of the corresponding beacon at the respective second mobile device;
a third processing unit to store a requirement relating to a device application; and
a fourth processing unit to analyze information stored in the memory and determine if at least one WLAN satisfies the device application requirement based in part on the corresponding WLAN beacon timing and recommends a handoff to the at least one WLAN.

52. A method of utilizing time-based information to improve communication in a wireless network, comprising:
communicating via a WLAN component with one or more WLANs;
receiving, via a WWAN component and from a WWAN, one or more beacon timings of one or more beacons associated with one or more WLANs;
wherein each WLAN beacon timing was previously received at the WWAN from at least one second mobile device;
wherein each WLAN beacon timing includes a timing of each beacon of each WLAN based on a receipt of the respective beacon by the respective second mobile device;
wherein each WLAN beacon timing represents a time on the respective second mobile device corresponding to an arrival of the corresponding beacon at the respective second mobile device;
storing a requirement relating to a device application; and
analyzing, by a processor, information stored in the memory and determining if at least one WLAN satisfies the device application requirement based in part on the corresponding WLAN beacon timing and recommends a handoff to the at least one WLAN.

53. The method of claim 52 further comprising a coupling to a computer to utilize the WWAN component or the WLAN component through the computer.

54. The method of claim 52, wherein at least one beacon timing associated with the one or more WLANs is utilized by the processor to determine a handoff management schedule.

55. The method of claim 54, wherein the handoff management schedule is based at least in part on channel quality information.

56. The method of claim 54, wherein the handoff management schedule is based in part on tuning to each of the one or more WLANs at corresponding beacon timings and measuring received channel quality information received from each of the one or more WLANs.

57. A mobile device capable of performing a handoff, comprising:
means for receiving a beacon comprising beacon information from one or more access points, wherein the beacon information include location information corresponding to each of the one or more access points;
means for associating a time-stamp with the beacon information, based on an arrival time at the mobile device of the beacon, utilizing a timing of a Global Positioning System (GPS) functionality;
means for transmitting the time-stamp and the beacon information to a network management system;
means for receiving a listing of local access points and corresponding beacon arrival times relative to the timing of the GPS functionality based on the location information corresponding to the beacon information;
wherein one or more of the beacon arrival times were previously received at the network management system from one or more second mobile devices;
wherein the one or more beacon arrival times correspond to a beacon of one or more of the local access points based on a receipt of the beacon by the one or more second mobile devices;
wherein the one or more beacon arrival times comprise time-stamp information representing a time on the one or more second mobile devices corresponding to an arrival of the beacon at the respective second mobile device; and
means for determining, based on the listing, a handoff management schedule between a WWAN, WLAN or WPAN.

58. At least one processor capable of performing a handoff, comprising:
a first processing unit, comprising hardware, to receive a beacon comprising beacon information from one or more access points, wherein the beacon information includes location information corresponding to each of the one or more access points;
a second processing unit to associate a time-stamp with the beacon information, based on an arrival time at the mobile device of the beacon, utilizing a timing of a Global Positioning System (GPS) functionality;
a third processing unit to transmit the time-stamp and the beacon information to a network management system;
a fourth processing unit to receive a listing of local access points and corresponding beacon arrival times relative to the timing of the GPS functionality based on the location information corresponding to the beacon information;
wherein one or more of the beacon arrival times were previously received at the network management system from one or more second mobile devices;
wherein the one or more beacon arrival times correspond to a beacon of one or more of the local access points based on a receipt of the beacon by the one or more second mobile devices;
wherein the one or more beacon arrival times comprise time-stamp information representing a time on the one or more second mobile devices corresponding to an arrival of the beacon at the respective second mobile device; and
a fifth processing unit to determine, based on the listing, a handoff management schedule between a WWAN, WLAN or WPAN.

59. A mobile device for seamless switching between a WWAN and a WLAN, comprising:
- means or receiving, from a WWAN access point, timing information of at least one WLAN beacon corresponding to at least one WLAN access point;
  - wherein the timing information was previously received at the WWAN access point from a second mobile device;
  - wherein the timing information is based on a receipt of the at least one WLAN beacon by the second mobile device;
  - wherein the timing information is defined by a timestamp representing a time on the second mobile device corresponding to an arrival time of the at least one WLAN beacon at the second mobile device;
- means or detecting a WLAN beacon at a receipt time according to the received timing information;
- means or detecting a beacon quality level;
- means for transmitting the beacon quality level with the associated receipt time to a network management system; and
- means for switching the mobile device between the WWAN access point and a WLAN access point based on information received from the management system in response to the transmitted beacon quality level and associated beacon receipt time.

60. A computer program product for seamless switching between a WWAN and a WLAN, comprising:
- a non-transitory computer readable medium, comprising:
- at least one instruction executable by a computer to receive, at a mobile device and from a WWAN access point, timing information of at least one WLAN beacon corresponding to at least one WLAN access point;
  - wherein the timing information was previously received at the WWAN access point from a second mobile device;
  - wherein the timing information is based on a receipt of the at least one WLAN beacon by the second mobile device;
  - wherein the timing information is defined by a timestamp representing a time on the second mobile device corresponding to an arrival time of the at least one WLAN beacon at the second mobile device;
- at least one instruction executable by the computer to detect a WLAN beacon at a receipt time according to the received timing information;
- at least one instruction executable by the computer to detect a beacon quality level;
- at least one instruction executable by the computer to transmit the beacon quality level with the associated receipt time to a network management system; and
- at least one instruction executable by the computer to switch the mobile device between the WWAN access point and a WLAN access point based on information received from the management system in response to the transmitted beacon quality level and associated beacon receipt time.

61. A method executable by a mobile device for seamless switching between a WWAN and a WLAN, comprising:
- receiving, at a receiver and from a WWAN access point, timing information of at least one WLAN beacon corresponding to at least one WLAN access point;
  - wherein the timing information was previously received at the WWAN access point from a second mobile device;
  - wherein the timing information is based on a receipt of the at least one WLAN beacon by the second mobile device;
  - wherein the timing information is defined by a timestamp representing a time on the second mobile device corresponding to an arrival time of the at least one WLAN beacon at the second more device;
- detecting a WLAN beacon at a receipt time according to the received timing information;
- detecting a beacon quality level;
- transmitting the beacon quality level with the associated receipt time to a network management system; and
- switching the mobile device between the WWAN access point and a WLAN access point based on information received from the management system in response to the transmitted beacon quality level and associated beacon receipt time.

62. A mobile device for seamless switching between a WWAN and a WLAN, comprising:
- a receiver to receive, from a WWAN access point, timing information of at least one WLAN beacon corresponding to at least one WLAN access point;
  - wherein the timing information was previously received at the WWAN access point from a second mobile device;
  - wherein the timing information is based on a receipt of the at least one WLAN beacon by the second mobile device;
  - wherein the timing information is defined by a timestamp representing a time on the second mobile device corresponding to an arrival time of the at least one WLAN beacon at the second mobile device;
- wherein the receive is further to detect a WLAN beacon at a receipt time according to the received timing information, and to detect a beacon quality level;
- a transmitter to transmit the beacon quality level with the associated receipt time to a network management system; and
- a processor to switch the mobile device between the WWAN access point and a WLAN access point based on information received from the management system in response to the transmitted be on quality level and associated beacon receipt time.

63. A computer program product for managing communications in a wireless network, comprising:
- a non-transitory computer readable medium, comprising:
- at least one instruction executable by a computer to detect, at a mobile device, presence of a WWAN and a plurality of WLANs;
- at least one instruction executable by the computer to receive a beacon from at least one WLAN access point;
- at least one instruction executable by the computer to determine beacon timing information corresponding to the beacon, the beacon timing information representing a time on the mobile device corresponding to an arrival of the beacon at the mobile device; and
- at least one instruction executable by the computer to transmit the beacon timing information to a WWAN access point for storage and distribution thereof to other mobile devices for ascertaining whether to transfer between the WWAN and one of the plurality of WLANs based at least in part on the associated WLAN beacon timing.

64. At least one processor to manage communications in a wireless network, comprising:
- a first processing unit, comprising hardware, to detect at a mobile device presence of a WWAN and a plurality of WLANs;

a second processing unit to receive a beacon from at least one WLAN access point;

a third processing unit to determine beacon timing information corresponding to the beacon, the beacon timing information representing a time on the mobile device corresponding to an arrival of the beacon at the mobile device; and a fourth processing unit to transmit the beacon timing information to a WWAN access point for storage and distribution thereof to other mobile devices for ascertaining whether to transfer between the WWAN and one of the plurality of WLANs based at least in part on the associated WLAN beacon timing.

65. A computer program product for enhancing network communication through time-based information, comprising:

a non-transitory computer readable medium, comprising:

at least one instruction executable by a computer to detect at a mobile device presence of a WWAN and a plurality of WLANs;

at least one instruction executable by the computer to receive a beacon from at least one WLAN access point;

at least one instruction executable by the computer to determine a beacon timing information corresponding to the beacon, wherein the beacon timing information represents a time on the mobile device corresponding to an arrival of the beacon at the mobile device; and at least one instruction executable by the computer to transmit the beacon timing information to a WWAN access point, wherein the WWAN access point is capable of receiving and storing the beacon timing information, and wherein the WWAN access point is capable of distributing the beacon timing information to other mobile devices for ascertaining whether to transfer between the WWAN and one of the plurality of WLANs based at least in part on the associated WLAN beacon timing.

* * * * *